(12) United States Patent
Wang et al.

(10) Patent No.: US 11,419,128 B2
(45) Date of Patent: Aug. 16, 2022

(54) USER EQUIPMENT AND COMMUNICATION METHODS

(71) Applicant: Panasonic Intellectual Property Corporation of America, Torrance, CA (US)

(72) Inventors: Lilei Wang, Beijing (CN); Hidetoshi Suzuki, Kanagawa (JP); Madhav Gupta, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/260,914

(22) PCT Filed: Aug. 1, 2018

(86) PCT No.: PCT/CN2018/098115
§ 371 (c)(1),
(2) Date: Jan. 15, 2021

(87) PCT Pub. No.: WO2020/024175
PCT Pub. Date: Feb. 6, 2020

(65) Prior Publication Data
US 2021/0266921 A1    Aug. 26, 2021

(51) Int. Cl.
*H04W 72/10*     (2009.01)
*H04B 17/318*    (2015.01)
(Continued)

(52) U.S. Cl.
CPC .......... *H04W 72/10* (2013.01); *H04B 17/318* (2015.01); *H04W 72/0406* (2013.01); *H04W 72/08* (2013.01)

(58) Field of Classification Search
CPC ........................ H04B 17/318; H04W 72/02; H04W 72/0406; H04W 72/08; H04W 72/10; H04W 74/0808
See application file for complete search history.

(56) References Cited

U.S. PATENT DOCUMENTS 11,096,192 B2 * 8/2021 Hou .................... H04W 72/121
2017/0332207 A1 11/2017 Sheng et al.
(Continued)

FOREIGN PATENT DOCUMENTS

CA      3036351 A1    10/2017
CN    106470485 A     3/2017
(Continued)

OTHER PUBLICATIONS

International Search Report, dated Apr. 23, 2019, for corresponding International Application No. PCT/CN2018/098115, 2 pages.

*Primary Examiner* — Saad A. Waqas
(74) *Attorney, Agent, or Firm* — Seed IP Law Group LLP

(57) ABSTRACT

Provided are user equipment and communication methods. The user equipment includes: circuitry, operative to sense plurality of resources within a transmission resource pool during a sensing window, and select one or more resources from the transmission resource pool during a resource selection window according to a sensing result in the sensing window, wherein one or more of the sensing window and the resource selection window is configured, preconfigured, or specified according to a type of traffic; and a transmitter, operative to transmit the traffic by using the selected one or more resources.

14 Claims, 13 Drawing Sheets

(51) Int. Cl.
*H04W 72/04* (2009.01)
*H04W 72/08* (2009.01)

(56) References Cited

U.S. PATENT DOCUMENTS

| | | | |
|---|---|---|---|
| 2018/0092065 A1 | 3/2018 | Sheng | |
| 2018/0332564 A1* | 11/2018 | Lee | H04W 72/048 |
| 2019/0045465 A1* | 2/2019 | Lee | H04W 92/18 |
| 2019/0132818 A1 | 5/2019 | Yasukawa et al. | |
| 2019/0132832 A1 | 5/2019 | Uchiyama et al. | |
| 2020/0029340 A1* | 1/2020 | He | H04B 7/2615 |
| 2020/0275458 A1* | 8/2020 | Khoryaev | H04W 4/46 |
| 2020/0280961 A1* | 9/2020 | Lee | H04W 4/40 |

FOREIGN PATENT DOCUMENTS

| | | |
|---|---|---|
| JP | 2017/208796 A | 11/2017 |
| WO | 2017/176097 A1 | 10/2017 |
| WO | 2017/179286 A1 | 10/2017 |

* cited by examiner

USER EQUIPMENT AND COMMUNICATION METHODS

BACKGROUND

1. Technical Field

The present disclosure relates to wireless communication field, and in particular, to a user equipment (UE) and communication methods.

2. Description of the Related Art

Currently, 3rd Generation Partnership Project (3GPP) would like to specify standards for New Radio (NR) Vehicle to anything (V2X), which is targeted for supporting more advanced usage cases like platooning, extended sensors, advanced driving, remote driving and so on. Based on latest discussions on NR V2X evaluation study item (SI), unicast, multicast, and broadcast traffics with physical layer differentiation are potential traffics supported in NR and will be evaluated in 3GPP NR V2X SI. For example, typical unicast/multicast traffic like platooning is identified as one of prioritized usage cases from both 5G Automotive Association (SGAA) and Society of Automotive Engineers (SAE). In NR V2X, a UE may need to transmit mixed traffics at the same time, e.g., the UE may transmit unicast based platooning traffic while transmitting broadcast based Basic Safety Message (BSM) traffic. In addition, traffics may be aperiodic and periodic. Thus, compared with Long Term Evolution (LTE) which is mainly targeting for periodic traffic, the traffics supported in NR are more complicated, therefore, it is expected to minimize mutual impacts between different traffics to guarantee performance, and the requirement on latency and reliability is also higher in NR.

In LTE sidelink based V2X, the physical layer is mainly targeting for Semi-Persistent Scheduling (SPS) transmission based on a sensing procedure. However, it is unclear how to support sensing for non-SPS (Semi-Persistent Scheduling) traffic. Conventionally, the non-SPS traffic may be supported in an exceptional resource pool via random selection if the sensing is not available. Therefore, it is expected that the sensing and resource selection procedures for aperiodic traffics in NR V2X can be clearly determined.

In addition, currently, one transmission resource pool is activated per zone, which is selected based on the UE's geometry. However, one transmission resource pool may not be sufficient to support multiple types of traffics generated by UE in NR V2X. For a scenario that multiple transmission resource pools are activated per zone, the number of transmission resource pools supported per zone needs to be minimized to keep better resource utilization. On the other hand, it is necessary to consider how to minimize the impacts among different traffics.

SUMMARY

One non-limiting and exemplary embodiment facilitates sensing and resource selection procedures for different types and transmission modes of traffics in NR V2X. The embodiments herein disclosed may be applicable to V2I (vehicle to infrastructure), V2P (vehicle to pedestrian), V2V (vehicle to vehicle), and any other communication using NR sidelink.

In a general aspect of the present disclosure, there is provided a user equipment, including: circuitry, operative to sense a plurality of resources within a transmission resource pool during a sensing window, and select one or more resources from the transmission resource pool during a resource selection window according to a sensing result in a sensing window, wherein one or more of the sensing window and the resource selection window is configured, preconfigured, or specified according to a type of traffic; and a transmitter, operative to transmit the traffic by using the selected one or more resources.

In another general aspect of the present disclosure, there is provided a communication method, including: sensing a plurality of resources within a transmission resource pool during a sensing window; selecting one or more resources from the transmission resource pool during a resource selection window according to a sensing result in a sensing window, wherein one or more of the sensing window and the resource selection window is configured, preconfigured, or specified according to a type of traffic; and transmitting the traffic by using the selected one or more resources.

In another general aspect of the present disclosure, there is provided a user equipment, including: a receiver, operative to receive traffic; and circuitry, operative to decode the received traffic, wherein the received traffic is transmitted by using one or more resources that are selected from a transmission resource pool during a resource selection according to a sensing result in a sensing window, and wherein the sensing result is generated by sensing a plurality of resources within the transmission resource pool during the sensing window, and wherein one or more of the sensing window and the resource selection window is configured, preconfigured, or specified according to a type of the traffic.

In another general aspect of the present disclosure, there is provided a communication method, including: receiving traffic; and decoding the received traffic, wherein the received traffic is transmitted by using one or more resources that are selected from a transmission resource pool during a resource selection according to a sensing result in a sensing window, and wherein the sensing result is generated by sensing a plurality of resources within the transmission resource pool during the sensing window, and wherein one or more of the sensing window and the resource selection window is configured, preconfigured, or specified according to a type of the traffic.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
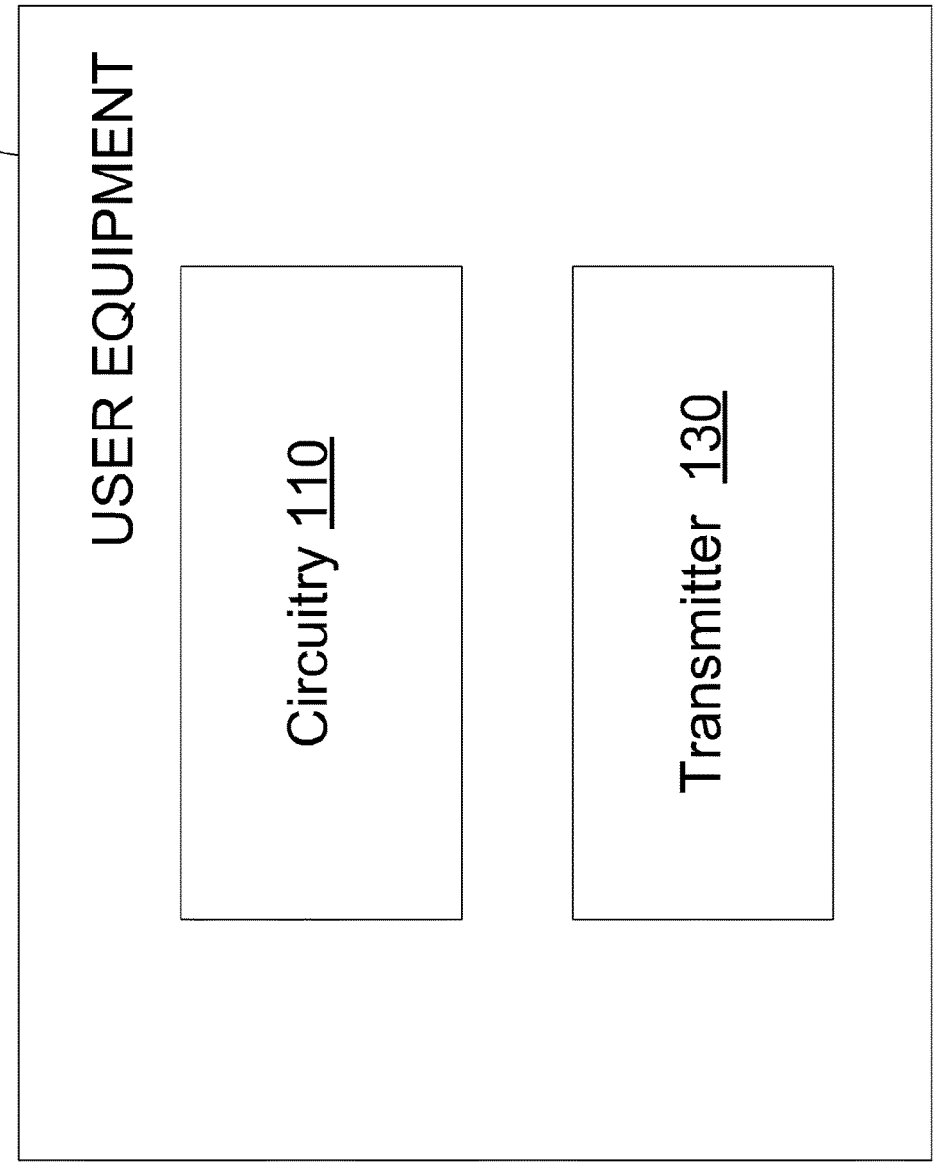
FIG. 1 illustrates a block diagram of a user equipment according to an embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

FIG. 1 illustrates a block diagram of a user equipment (UE) 100 according to an embodiment of the present disclosure.

As show in the example of FIG. 1, the UE 100 includes circuitry 110 and a transmitter 130. In an embodiment, the circuitry 110 senses multiple resources within a transmission resource pool during a sensing window, and selects one or more resources from the transmission resource pool during a resource selection window according to a sensing result in a sensing window. In an embodiment, one or more of the sensing window and the resource selection window is configured, preconfigured, or specified according to a type of traffic. The transmitter 130 in the UE 100 transmits the traffic by using the selected resources.

In an embodiment, the UE 100 shown in FIG. 1 may transmit different types of traffic. For example, the traffic may include a first type of traffic and/or a second type of traffic. As described above, one or more of the sensing window and the resource selection window is configured, preconfigured, or specified according to a type of traffic. For example, a first sensing window is configured, preconfigured, or specified for the first type of traffic, a second sensing window is configured, preconfigured, or specified for the second type of traffic, a first resource selection window is configured, preconfigured, or specified for the first type of traffic, and a second resource selection window is configured, preconfigured, or specified for the second type of traffic.

In one embodiment, the time duration of the second sensing window for the second type of traffic is shorter than that of the first sensing window for the first type of traffic, and the time duration of a second resource selection window for the second type of is shorter than that of the first resource selection window for the first type of traffic.

In an embodiment, the first type of traffic is periodic traffic and the second type of traffic is aperiodic traffic. The time duration of the second sensing window for the aperiodic traffic is shorter than that of the first sensing window for the periodic traffic, and the time duration of a second resource selection window for the aperiodic traffic is shorter than that of the first resource selection window for the periodic traffic.

Advantageously, by configuring, preconfiguring, or specifying sensing windows and resource selection windows according to types of traffic, the sensing and resource selection procedures for aperiodic traffics in NR V2X can be realized. Furthermore, by utilizing a shortened sensing window and/or a shortened resource selection window for the aperiodic traffic, the aperiodic traffic in NR V2X can be supported more efficiently.

Although specific types of periodic and aperiodic are described as above, the skilled in the art should understand that those are only for illustrative purposes, and various types of traffic may be applied thereto. For example, in another embodiment, the first type of traffic is high latency traffic and the second type of traffic is low latency traffic. The time duration of one or both of the second sensing window and the second resource selection window for the low latency traffic is shorter than that of one or both of the first sensing window and the first resource selection window for the high latency traffic. In another embodiment, the first type of traffic is non-security traffic and the second type of traffic is security traffic. The time duration of one or both of the second sensing window and the second resource selection window for the security traffic is shorter than that of one or both of the first sensing window and the first resource selection window for the non-security traffic. Other examples are available too, as long as the time duration of one or both of the second sensing window and the second resource selection window for the more prioritized traffic is shorter than that of one or both of the first sensing window and the first resource selection window for the less prioritized traffic.

Although the terms "first" and "second" are used herein to describe various types of traffic, these terms are only used to distinguish one type of traffic from another type of traffic, and not intend to limit the type of traffic. In addition, a third type of traffic may be available, as long as the time durations of one or both of the sensing window and the resource selection window are different among the first type of traffic, the second type of traffic, and the third type of traffic. More than three types of traffic are available too, and examples are omitted herein for brevity and clarity.

Figure 2:
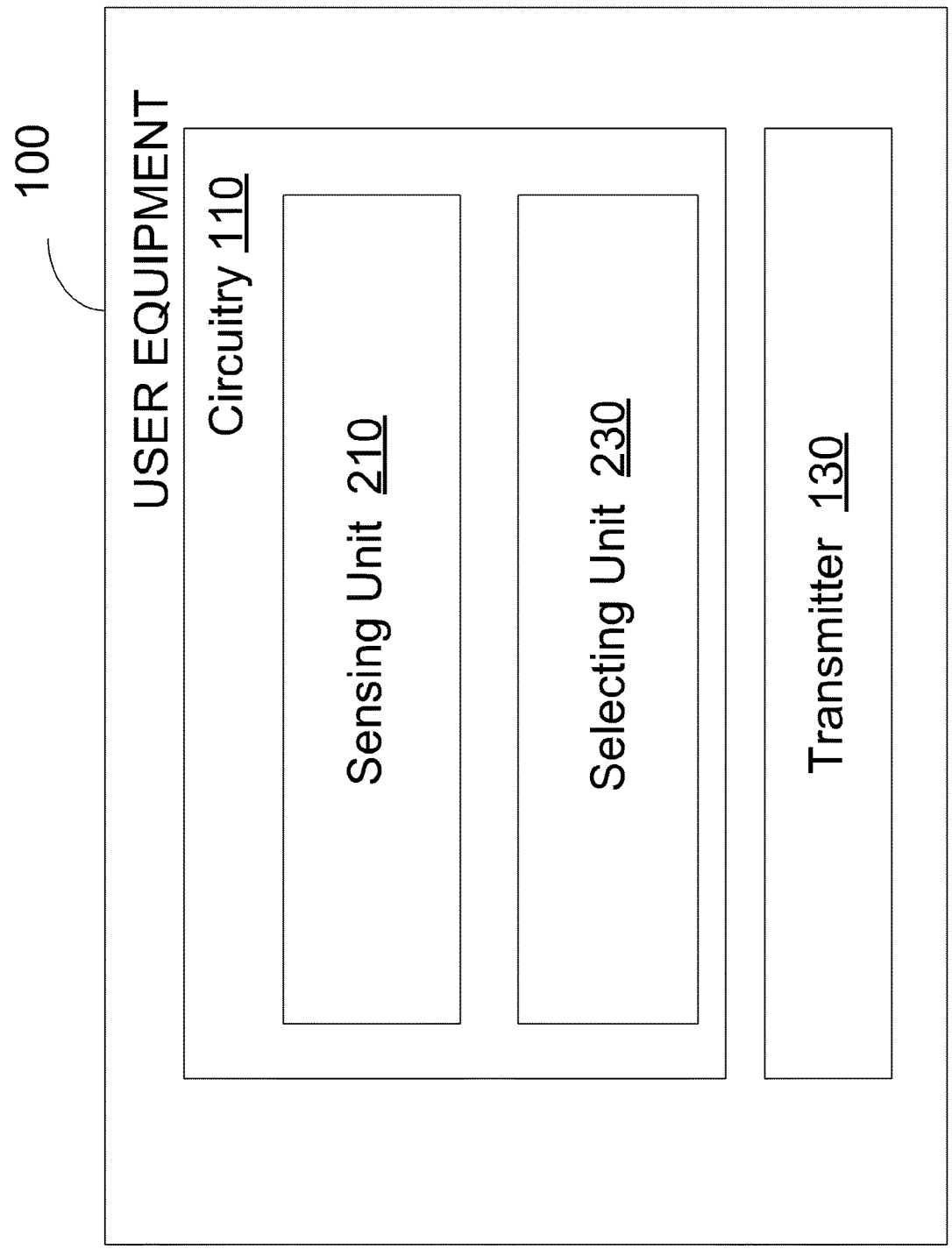
FIG. 2 schematically shows a block diagram of a user equipment according to an embodiment of the present disclosure.

FIG. 2 schematically shows a diagram of a user equipment 100 according to an embodiment of the present disclosure. The same reference numbers are used in FIG. 2 for indicating the same elements as shown in FIG. 1. In an embodiment, the circuitry 110 in the UE 100 includes a sensing unit 210 and a selecting unit 230.

In one embodiment, for the first type of traffic, the sensing unit 210 may decode Physical Sidelink Control Channel (PSCCH) and measure Reference Signal Received Power (RSRP) of Physical Sidelink Shared Channel (PSSCH) during the first sensing window, and perform measurement to obtain first measured Sidelink Received Signal Strength Indicator (S-RSSI) during the first sensing window, and the selecting unit 230 may exclude one or more resources to obtain one or more available resources for transmitting the first type of traffic according to the measured RSRP sensed during the first sensing window and rank the obtained available resources according to the first measured S-RSSI during the first resource selection window.

In an embodiment, for the second type of the traffic, the sensing unit 210 may decode PSCCH and measure RSRP of PSSCH during the first sensing window, and perform measurement to obtain second measured S-RSSI during the second sensing window, and the selecting unit 230 may exclude one or more resources to obtain one or more available resources for transmitting the second type of traffic according to the measured RSRP sensed during the first sensing window and rank the obtained available resources according to the second measured S-RSSI during the second resource selection window.

The operations of the sensing unit 210 and the selecting unit 230 will be described in detail with reference to FIG. 3, which illustrates a configuration of the sensing windows and the resource selection windows for a first type of traffic and a second type of traffic, according to an embodiment of the present disclosure.

Figure 3:
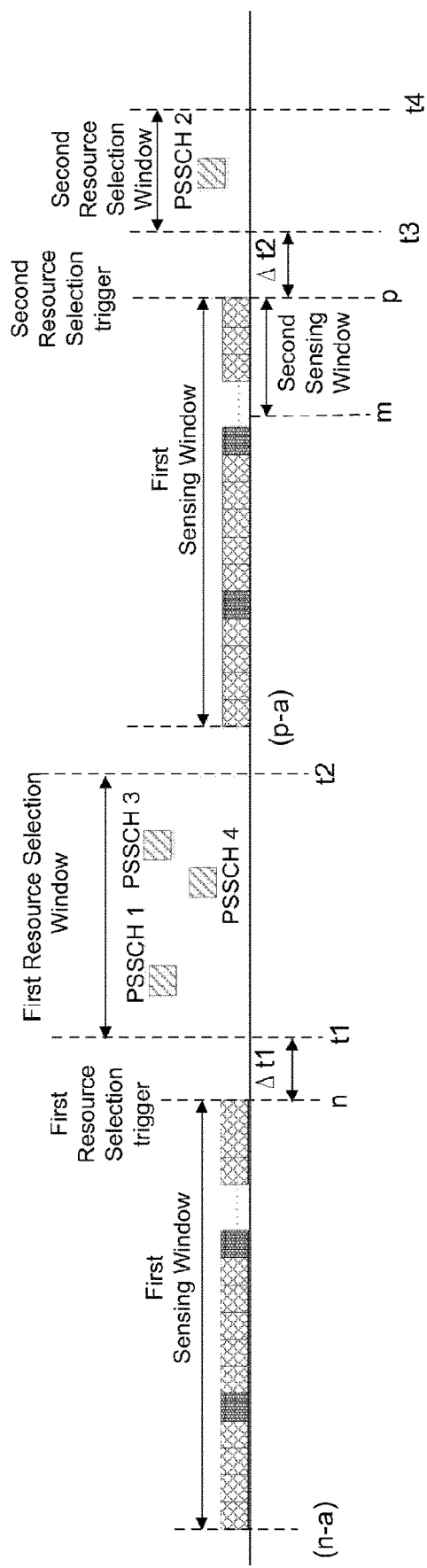
FIG. 3 schematically shows a configuration of sensing windows and resource selection windows for a first type of traffic and a second type of traffic according to an embodiment of the present disclosure.

FIG. 3 schematically shows first sensing windows that are configured, preconfigured, or specified for a first type of traffic (e.g., periodic traffic) and a second sensing window that is configured, preconfigured, or specified for a second type of traffic (e.g., aperiodic traffic), and a first resource selection window that is configured, preconfigured, or specified for the first type of traffic and a second resource selection window that is configured, preconfigured, or specified the second type of traffic.

As shown in the example of FIG. 3, the time period from time (n-a) to time n and the time period from time (p-a) to time p may be the first sensing windows that are configured, preconfigured, or specified for the first type of traffic, and the time period from time m to time p may be the second sensing window that is configured, preconfigured, or specified for the second type of traffic. The time period from time t1 to time t2 may be the first resource selection window that is configured, preconfigured, or specified for the first type of traffic. The time period from time t3 to time t4 may be the second resource selection window that is configured, preconfigured, or specified for the second type of traffic. In an embodiment, time duration of the second sensing window is shorter than that of the first sensing window. In an embodiment, time duration of the second resource selection window is shorter than that of the first resource selection window. In an embodiment, time durations of both of the second sensing window and the second resource selection window are shorter than those of both of the first resource selection window and the first resource selection window.

The time t1 and time t2 shown in FIG. 3 are only for illustrative purposes, and time t1 and time t2 can be configured, preconfigured, or specified according to the type of traffic, and the duration of the resource selection window is depending on the time different between time t2 and time t1. Similar principles can be applied to time t3 and time t4 that are designated for the second resource selection window. Moreover, the time (n-a) (or (p-a)) and time n (or p) shown in FIG. 3 are also for illustrative purposes and time (n-a) (or (p-a)) and time n (or p) can be configured, preconfigured, or specified according to the type of traffic, and the duration of the sensing window is depending on the time different between time (n-a) and time n (or time (p-a) and time p). Similar principles can be applied to time m and time p that are designated for the second sensing window.

As the first type of traffic is triggered (e.g., at time n), in this case, for that first type of traffic, the sensing unit 210 decodes Physical Sidelink Control Channel (PSCCH) and measures Reference Signal Received Power (RSRP) of Physical Sidelink Shared Channel (PSSCH) during the first sensing window which is from time (n-a) to time n as shown in the example of FIG. 3, and perform measurement to obtain first measured Sidelink Received Signal Strength Indicator (S-RSSI) during the first sensing window (from time (n-a) to time n). For example, the sensing unit 210 samples multiple symbols (shown as blocks filled with dots) among all of the symbols (the symbols filled with cross lines as well as the sample symbols) in the first sensing window (from time (n-a) to time n), measures energy of the sampled symbols and averages the measured energy so as to obtain the first S-RSSI in the first sensing window (from time (n-a) to time n) for the first type of traffic.

When a first resource selection for a first type of traffic is triggered (e.g., at time n) by a higher layer, for the first type of traffic, the selecting unit 230 excludes one or more unavailable resources to obtain one or more available resources for transmitting the first type of traffic, e.g., periodic traffic, during the first resource selection window which is from time t1 to time t2, according to the measured RSRP sensed during the first sensing window (from time (n-a) to time n), and rank the obtained available resources according to the first measured S-RSSI during the first resource selection window (from time t1 to time t2). For example, the selecting unit 230 may rank the available resources (i.e., candidate resources) from high to low in the order of increasing RSSI, such that the candidate resource with the lowest energy prediction is the highest-ranked candidate for resource selection. The selecting unit 230 then reports a certain ratio of highest ranked candidates (e.g., 20% of total candidate resources) to a higher layer which selects one or more resources among the ranked candidate resources for transmitting the first type of traffic. As shown in the example of FIG. 3, resources of PSSCH1, PSSCH4, and PSSCH3 may be selected for transmitting the first type of traffic.

As the second type of traffic is triggered (e.g., at time p), in this situation, for the second type of traffic, the sensing unit 210 may decode PSCCH and measure RSRP of PSSCH during the first sensing window which is from time (p-a) to time p, and perform measurement to obtain second measured S-RSSI during the second sensing window which is from time m to time p. For example, the sensing unit 210 may sample multiple symbols among all of the symbols in the second sensing window (from time m to time p), measure energy of the sampled symbols, and average the measured energy so as to obtain the second S-RSSI in the second sensing window (from time m to time p) for the second type of traffic.

When a second resource selection for the second type of traffic (e.g., at time p) is triggered by a higher layer, for the second type of traffic, the selecting unit 230 excludes one or more unavailable resources to obtain one or more available resources for transmitting the second type of traffic, e.g., aperiodic traffic, during the second resource selection window (from time t3 to t4), according to the measured RSRP sensed during the first sensing window (e.g., from time (p-a) to p) by the sensing unit 210, and rank the obtained available resources according to the second measured S-RSSI during the second resource selection window (e.g., from time t3 to t4). For example, the selecting unit 230 may rank the available resources (i.e., candidate resources) from high to low in the order of increasing RSSI, such that the candidate resource with the lowest energy prediction is the highest-ranked candidate for resource selection. The selecting unit 230 then reports a certain ratio of highest ranked candidate resources (e.g., 20% of total candidate resources) to a higher layer which selects one or more resources among the ranked candidate resources for transmitting the second type of traffic. As shown in the example of FIG. 3, resource of PSSCH2 is selected for transmitting the second type of traffic in the second resource selection window (e.g., from time t3 to t4).

As shown in the example of FIG. 3, a time gap $\Delta t1$ between time n and time t1 indicates that from the time (time n) when the first resource selection for the first type of traffic is triggered, after the time gap $\Delta t1$, the selecting unit 230 starts to select resources for transmitting the first type of traffic, and a time gap $\Delta t2$ between time p and time t3 indicates that from the time (time p) when the second resource selection for the second type of traffic is triggered, after the time gap $\Delta t2$, the selecting unit 230 starts to select resources for transmitting the second type of traffic. However, $\Delta t1$ and $\Delta t2$ are only shown for illustrative purposes, and the skilled in the art will understand that the selecting unit 230 may start to select resources for transmitting corresponding types of traffic immediately after the resource selection is triggered.

Although the first sensing window and second sensing window use the same ending point (time p), that is only an example, different ending points may also be used in other cases. In addition, the number of symbols, the number of resources PSSCH, the number of sensing windows, and the number of selection windows shown in FIG. 3 are also for illustrative purposes, the numbers may vary depending on practical applications and scenarios. Furthermore, the sequences and trigger timings for resource selection triggers as shown in FIG. 3 are only examples, and other sequences and trigger timings for triggering resource selection for transmitting different types of traffic are also implementable depending on practical applications.

In addition, the types of traffic is not limited to the periodic traffic and aperiodic traffic as described above, other types of traffic, such as low latency traffic, high latency traffic, security traffic, and non-security traffic may also implementable according to the embodiments of the present disclosure. And the configurations of the sensing windows and the resource selection windows for the other types of traffic are similar as that described for the periodic traffic and aperiodic traffic, therefore, the details thereof are omitted for the purpose of clarity and brevity.

Moreover, FIG. 3 shows the sensing windows and resource selection windows are configured, preconfigured, or specified for the first type of traffic and second type of traffic, however, those are illustrated only for an example. The skilled in the art would understand that more types of traffic may also be applied thereto, and the configuration as described above may be applied to the more types of traffic. For example, a third type of traffic may be available here, and a third sensing window and a third resource selection window may be configured, preconfigured, or specified for the third type of traffic, as long as the time durations of one or both of the sensing window and the resource selection window that are configured, preconfigured, or specified for the respective type of traffic are different among the first type of traffic, the second type of traffic, and the third type of traffic. More than three types of traffic are available too, and examples are omitted herein for clarity and brevity.

Figure 4A:
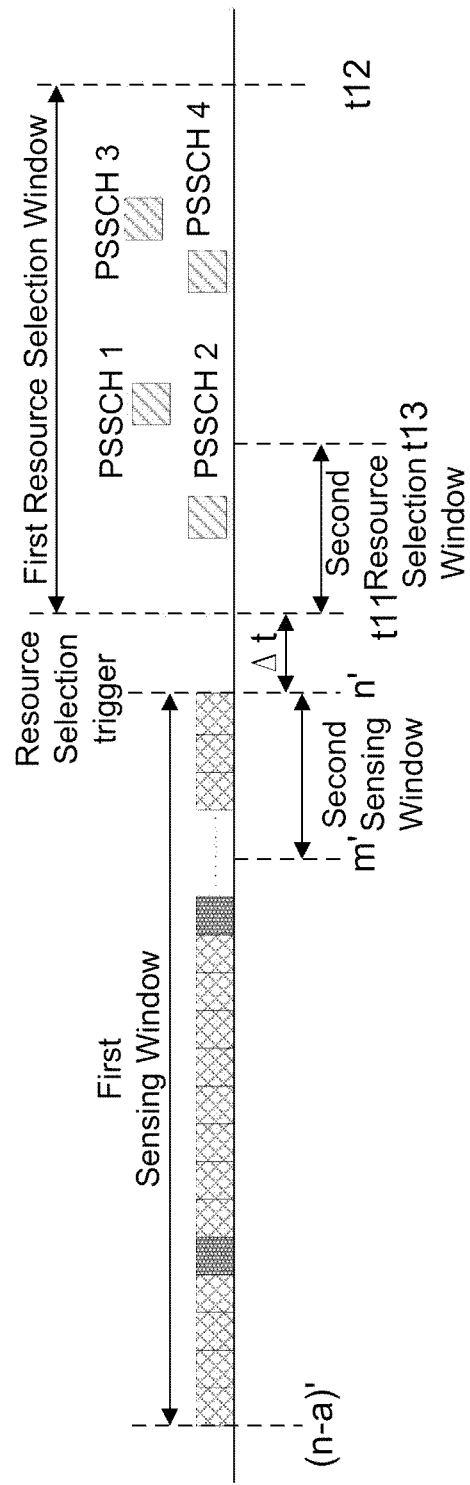
FIG. 4A schematically shows a configuration of resource selection windows for a first type of traffic and a second type of traffic, in accordance with priorities of the first type of traffic and the second type of traffic, according to an embodiment of the present disclosure.

FIG. 4A schematically shows a configuration of resource selection windows for a first type of traffic and a second type of traffic, in accordance with priorities of the first type of traffic and the second type of traffic, according to an embodiment of the present disclosure.

As shown in the example of FIG. 4A, the configuration of resource selection windows is based on priorities of the first type of traffic and the second type of traffic. Resource selections for the second type of traffic and the first type of traffic are triggered simultaneously at time n'. In that situation, a first sensing window for the first type of traffic is from time (n-a)' to time n', and a second sensing window for the second type of traffic is from time m' to time n'. And the first resource selection window is from time t11 to time t12, and the second resource selection window is from time t11 to time t13. In an embodiment, the time duration of the second sensing window is shorter than that of the first sensing window. In an embodiment, time duration of the second resource selection window is shorter than that of the first selection window.

In the situation that the second type of traffic and the first type of traffic are triggered simultaneously, the first sensing window and the second sensing window overlapped. Although the first sensing window and second sensing window use same ending point (time n'), that is only for an example, different ending points may also be used in other cases.

As shown in the example of FIG. 4A, the starting points of first resource selection window and the second resource selection window are the same, e.g., time t11. And when the second type of traffic has a higher priority, the selecting unit 230 operates earlier (i.e., with a higher priority) for the second type of traffic than for the first type of traffic for selecting the resources. For example, as shown in FIG. 4A, resource PSSCH 2 is selected during the second resource selection window (from time t11 to time t13) for the second type of traffic for transmitting the second type of traffic.

The operations of the sensing unit 210 and the selecting unit 230 (components included in the circuitry 110) are similar as those described with reference to FIG. 3, as the operations of the sensing unit 210 during the first sensing window and the second sensing window have been described above with reference to FIG. 3, and the operations of the selecting unit 230 during the first resource selection window and the second resource selection have also been described above with reference to FIG. 3, the details will be omitted herein for the purposes of clarity and brevity.

Moreover, a time gap $\Delta t$ between time n' and time t11 indicates after a time $\Delta t$ from the time when the resource selections are triggered, the selecting unit 210 starts to select resources for transmitting corresponding type of traffic. However, $\Delta t$ is only shown for illustrative purposes, and the skilled in the art will understand that the selecting unit 210 starts to select resources for transmitting corresponding type of traffic immediately after the resource selection is triggered.

The number of symbols and resources PSSCH as shown in FIG. 4A are also for illustrative purposes, there can be any number of symbols and resources depending on practical applications and scenarios.

Figure 4B:
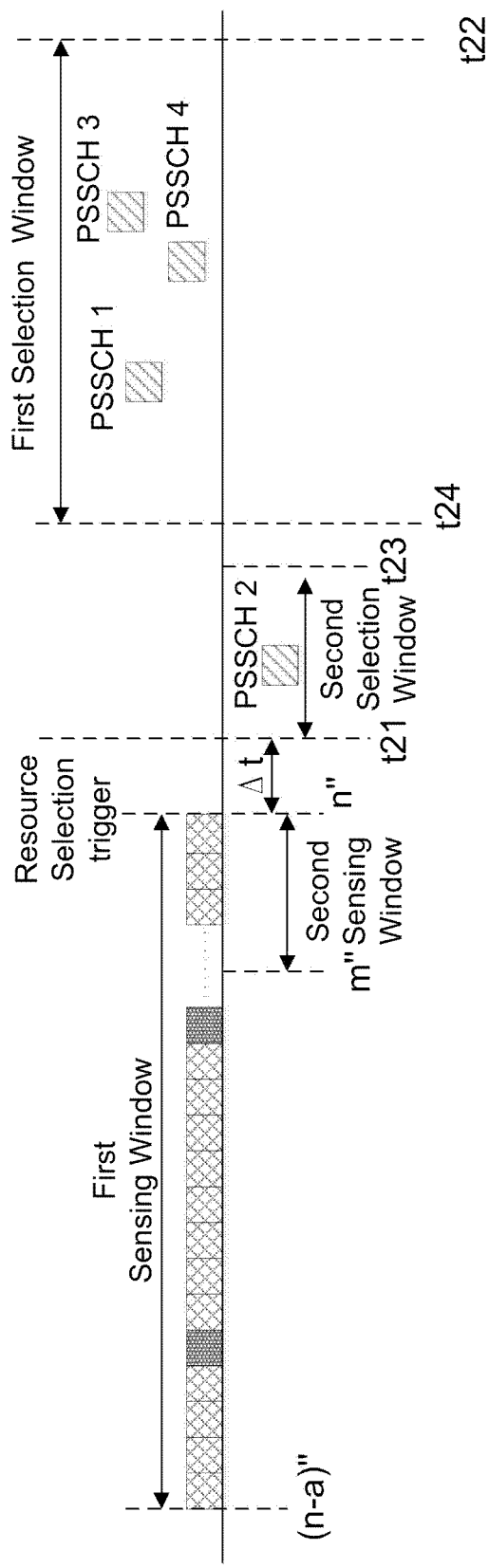
FIG. 4B schematically shows a configuration of resource selection windows for a first type of traffic and a second type of traffic, in accordance with Time-Division Multiplexed (TDMed) scheme, according to an embodiment of the present disclosure.

In addition, the operations of the sensing unit 210 and the selecting unit 230 (components included in the circuitry 110) are similar as those described with reference to FIG. 3, those skilled in the art would understand that the operations of the circuitry 110 as described above can also be applied to configurations of the sensing windows and the resource selection windows shown in FIG. 4A and other configurations of the sensing windows and the resource selection windows, as long as the sensing windows and the resource selection windows are configured, preconfigured, or specified according to the type of traffic. For example, for the configurations of the sensing windows and the resource selection windows shown in FIG. 4B and FIG. 4C, the operations of the circuitry 110 as described above can also be applied thereto. FIG. 4B schematically shows a configuration of resource selection windows for a first type of traffic and a second type of traffic, in accordance with Time-Division Multiplexed (TDMed) scheme, according to an embodiment of the present disclosure.

As operations of the circuitry 110 (including the sensing unit 210 and the selecting unit 230) for the configuration in FIG. 4B is the same as those described with reference to FIG. 3, the detailed operations of the circuitry 110 will be omitted herein for the purposes of clarity and brevity.

As shown in the FIG. 4B, the configuration of resource selection windows is based on Time-Division Multiplexed (TDMed) scheme. More specifically, as resource selections for a second type of traffic and a first type a traffic are triggered simultaneously at time n", in this case, a first sensing window from time (n-a) to time n" is configured, preconfigured, or specified for the first type of traffic, and a second sensing window from time m" to time n" is configured, preconfigured, or specified for the second type of traffic, and the first sensing window and the second sensing window are overlapped and the ending points of the first sensing window and the second sensing window both use time n". In an embodiment, the time duration of the second sensing window is shorter than that of the first sensing window.

As shown in FIG. 4B, the second resource selection window configured, preconfigured, or specified for the second type of traffic is from time t21 to time t23, and the first resource selection window configured, preconfigured, or specified for the first type of traffic is from time t24 to t22, and the second resource selection window is earlier than the first resource window.

The operations of the sensing unit 210 during the first sensing window and the second sensing window have been described above with reference to FIG. 3, and the operations of the selecting unit 230 during the first resource selection window and the second resource selection have also been described above with reference to FIG. 3, and therefore, the details will be omitted herein for the purposes of clarity and brevity. As shown in the example of FIG. 4B, resource of PSSCH2 may be selected for transmitting the second type of traffic, and resources of PSSCH1, PSSCH4, and PSSCH3 is selected for transmitting the first type of traffic.

Advantageously, by configuring the resource selection windows according to TDMed scheme, impacts between different types of traffic can be avoided during the procedure of resource selection.

It should be noted that, the number of symbols and resources PSSCH as shown in FIG. 4B are also for illustrative purposes, there can be any number of symbols and resources depending on practical applications and scenarios. And the time gap Δt is only shown for illustrative purposes, and the skilled in the art will understand that the selecting unit 230 starts to select resources for transmitting the second type of traffic immediately after the resource selections are triggered.

Figure 4C:
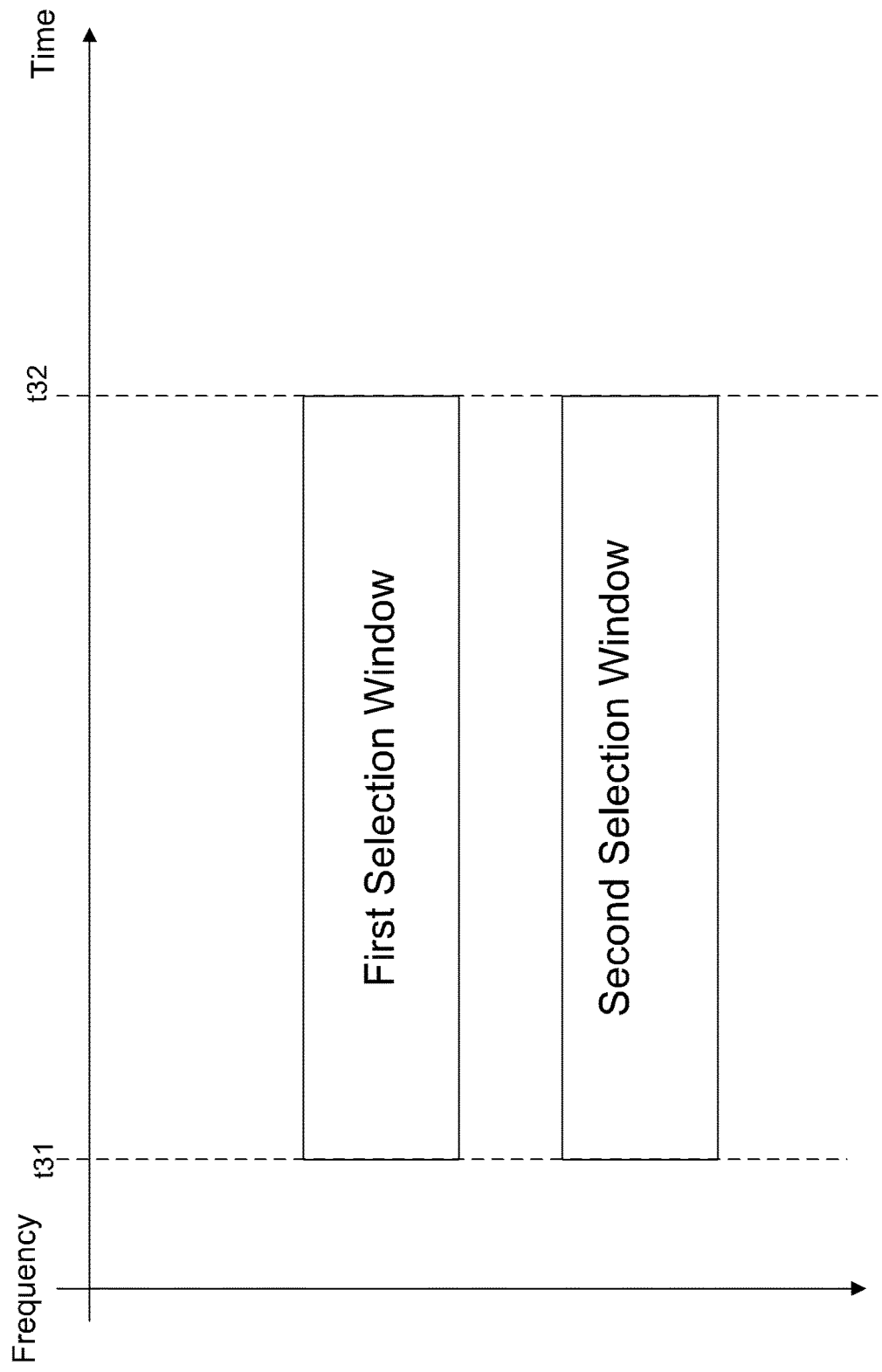
FIG. 4C schematically shows a configuration of resource selection windows for a first type of traffic and a second type of traffic, in accordance with Frequency-Division Multiplexed (FDM) scheme, according to an embodiment of the present disclosure.

FIG. 4C schematically shows a configuration of resource selection windows for a first type of traffic and a second type of traffic, in accordance with Frequency-Division Multiplexed (FDMed) scheme, according to an embodiment of the present disclosure.

As operations of the circuitry 110 (including the sensing unit 210, and the selecting unit 230) for the configuration in FIG. 4C are the same as that in FIG. 3, the detailed operations of the circuitry 110 has been described above and will be omitted herein for the purposes of clarity and brevity.

As shown in the FIG. 4C, as resource selections for a second type of traffic and a first type a traffic are triggered simultaneously at a time, both of the second resource selection window and the first resource selection window are from time t31 to t32, and the first resource selection window and the second resource selection window utilize different frequencies as shown in the example of FIG. 4C.

The operations of the sensing unit 210 during the first sensing window and the second sensing window have been described above with reference to FIG. 3, and the operations of the selecting unit 230 during the first resource selection window and the second resource selection have been described above with reference to FIG. 3, and the details will be omitted herein for the purposes of clarity and brevity. In addition, the configuration of the sensing windows for FIG. 4C may be the same as that shown in FIG. 4A and FIG. 4B, in which the first sensing window for the first type of traffic and the second sensing window for the second type of traffic are overlapped, and the ending point of the first sensing window and the ending point of the second sensing window are either at the same time or at different times depending on practical applications. In an embodiment, the time duration of the second sensing window is shorter than that of the first sensing window.

Advantageously, by configuring the resource selection windows according to FDMed scheme, impacts between different types of traffic can be avoided during the procedure of resource selection.

Moreover, FIG. 4A-FIG. 4C show the sensing windows and resource selection windows that are configured, preconfigured, or specified for the first type of traffic and second type of traffic, however, those are illustrated only for an example. The skilled in the art would understand that more types of traffic may also be applied thereto, and the configuration as described above may be applied to the more types of traffic. For example, a third type of traffic may be available here, and a third sensing window and a third resource selection window may be configured, preconfigured, or specified for the third type of traffic, as long as the time durations of one or both of the sensing window and the resource selection window that are configured, preconfigured, or specified for the respective type of traffic are different among the first type of traffic, the second type of traffic, and the third type of traffic. More than three types of traffic are available too, and examples are omitted herein for clarity and brevity.

In addition, the resource selection windows can be configured according to a scheme in which the first resource selection window and the second resource selection window are Code-Division Multiplexed (CDMed), when the second type of traffic and the first type a traffic are triggered simultaneously. In that situation, the configuration of the sensing windows for CDMed scheme may be the same as that shown in FIG. 3 and FIGS. 4A-4C, in which the first sensing window for the first type of traffic and the second sensing window for the second type of traffic are overlapped, and the ending point of the first sensing window and the ending point of the second sensing window are either at the same time or at different times depending on practical applications. In an embodiment, the time duration of the second sensing window is shorter than that of the first sensing window.

It should be noted that, the first resource selection window and the resource second selection window can be configured, preconfigured, or specified according to any other suitable schemes other than the schemes as described above.

The configuration of the sensing windows and the resource selection windows may be utilized for the scenario that the first type traffic (e.g., periodic traffic) and the second type of traffic (e.g., aperiodic traffic) coexist in the same transmission resource pool. However, there can be multiple transmission resource pools configured or preconfigured according to practical applications.

Figure 5:
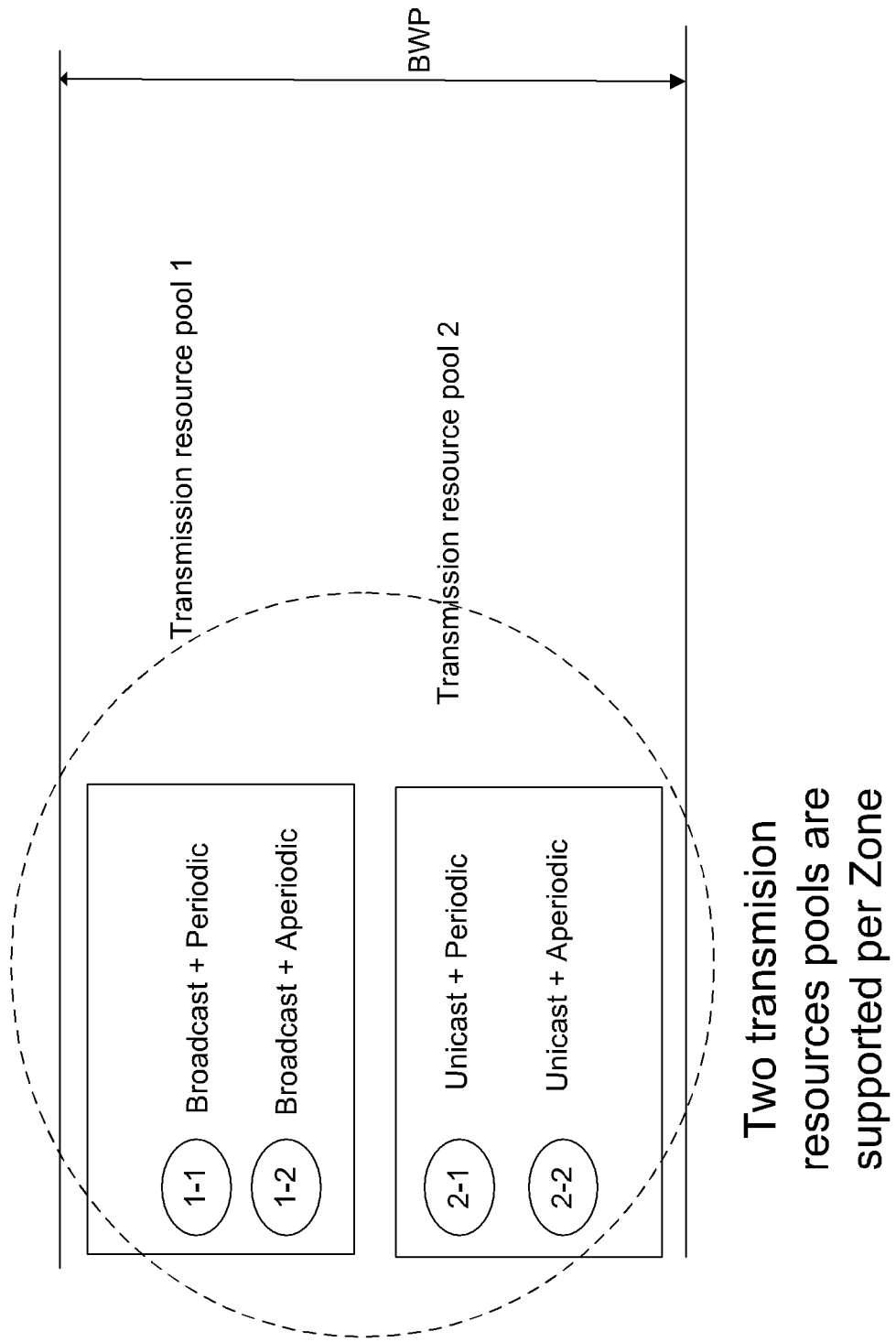
FIG. 5 schematically shows a configuration of multiple transmission resource pools according to an embodiment of the present disclosure.

In one embodiment, a first transmission resource pool is separated from a second transmission resource pool based on the transmission mode of the traffic. In one embodiment, the transmission mode includes broadcast, unicast, and multicast. FIG. 5 schematically shows a configuration of multiple transmission resource pools according to an embodiment of the present disclosure.

As shown in the example of FIG. 5, there are two transmission resource pools in a zone, e.g., a first transmission resource pool 1 and a second transmission resource pool 2. In one embodiment, the first transmission resource pool 1 is separated with the second transmission resource pool 2 based on the transmission mode of the traffic. For example, the first transmission resource pool for the first transmission mode is separated with the second transmission resource pool for the second transmission mode of traffic. For example, as shown in FIG. 5, the first transmission resource pool 1 is for the broadcast traffic (both period and aperiodic), and the second transmission resource pool 2 is for the unicast traffic (both period and aperiodic), and the first transmission resource pool 1 and the second transmission resource pool 2 is separated from each other.

Figure 6:
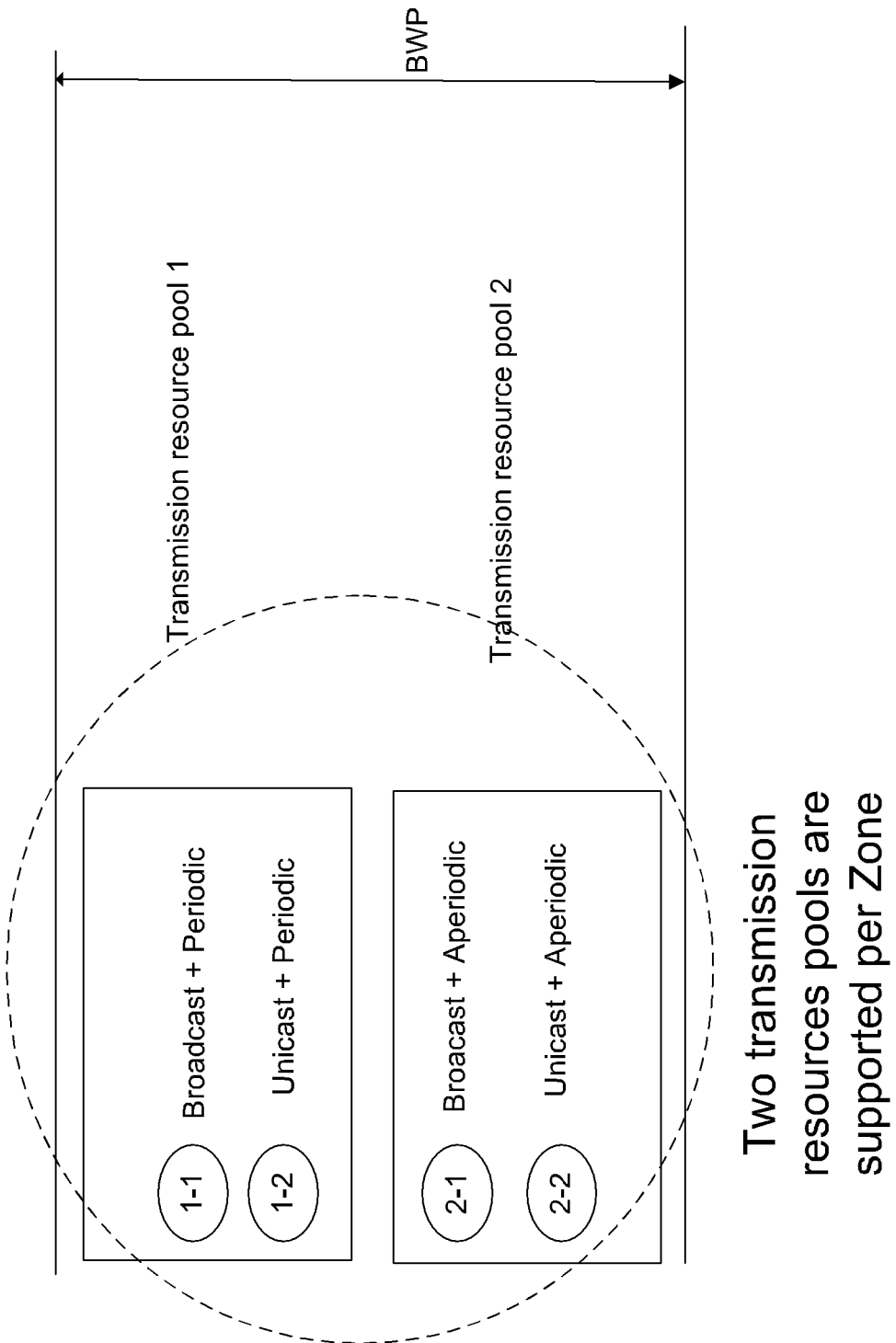
FIG. 6 schematically shows a configuration of multiple transmission resource pools according to another embodiment of the present disclosure.

In another embodiment, a first transmission resource pool is separated from a second transmission resource pool based on the type of the traffic. In one embodiment, the first type of traffic is the periodic traffic, and the second type of traffic is the aperiodic traffic. FIG. 6 schematically shows a configuration of multiple transmission resource pools according to an embodiment of the present disclosure.

As shown in the example of FIG. 6, there are two transmission resource pools in a zone, e.g., a first transmission resource pool 1 and a second transmission resource pool 2. In one embodiment, the first transmission resource pool 1 is separated with the second transmission resource pool 2 based on the type of the traffic. For example, the first transmission resource pool for the first type of traffic is separated with the second transmission resource pool for the second type of traffic. For example, as shown in FIG. 6, the first transmission resource pool 1 is for the first type traffic (both broadcast and unicast), and the second transmission resource pool 2 is for the second type of traffic (both broadcast and unicast), and the first transmission resource pool 1 and the second transmission resource pool 2 is separated from each other.

It should be noted that, although two transmission resources pools are shown in FIGS. 5 and 6, that is only for illustrative purposes, and other number of transmission resources pools also is available depending on practical application requirements.

In addition, the types of traffic is not limited to the periodic traffic and aperiodic traffic as described above, other types of traffic, such as low latency traffic, high latency traffic, security traffic, and non-security traffic may also implementable according to the embodiments of the present disclosure.

In addition, the multiple resources separation scheme can also be applied to different carrier cases. For example, a first transmission resource pool for a first carrier for transmitting one or more traffic and a second transmission resource pool for a second carrier for transmitting one or more traffic are separated. The "traffic" herein is not limited to only any specific single type of traffic or any specific transmission mode of traffic, but may also include several types or several types of transmission modes of traffic Furthermore, the multiple resources separation scheme can also be applied to different zone cases. For example, a first transmission resource pool for a first zone in which a first transmission mode of traffic is transmitted via sidelink and a second transmission resource pool in a second zone in which a second transmission mode of is transmitted via sidelink are separated.

Furthermore, multiple transmission resource pools can also be configured according to a configuration in which a first transmission resource pool and a second transmission resource pool respectively for the first type of traffic and the second type of traffic are shared, wherein the first type of traffic and the second type of traffic comprise periodic traffic and aperiodic traffic, respectively.

In addition, a first transmission resource pool can also be separated from a second transmission resource pool based on the priority of the traffic. For example, a first transmission resource pool may be used for traffic with a first priority of traffic, and a second transmission resource pool may be used for traffic with a second priority of traffic, and the first transmission resource pool and the second transmission resource pool are separated from each other.

The operation of the circuitry 110 for sensing and selection resources in a transmission resource pool as described above may be applied to a scenario that multiple transmission resource pools exist, and the detailed description of sensing and selection resources the will be omitted herein for the purposes of clarity and brevity.

Figure 7:
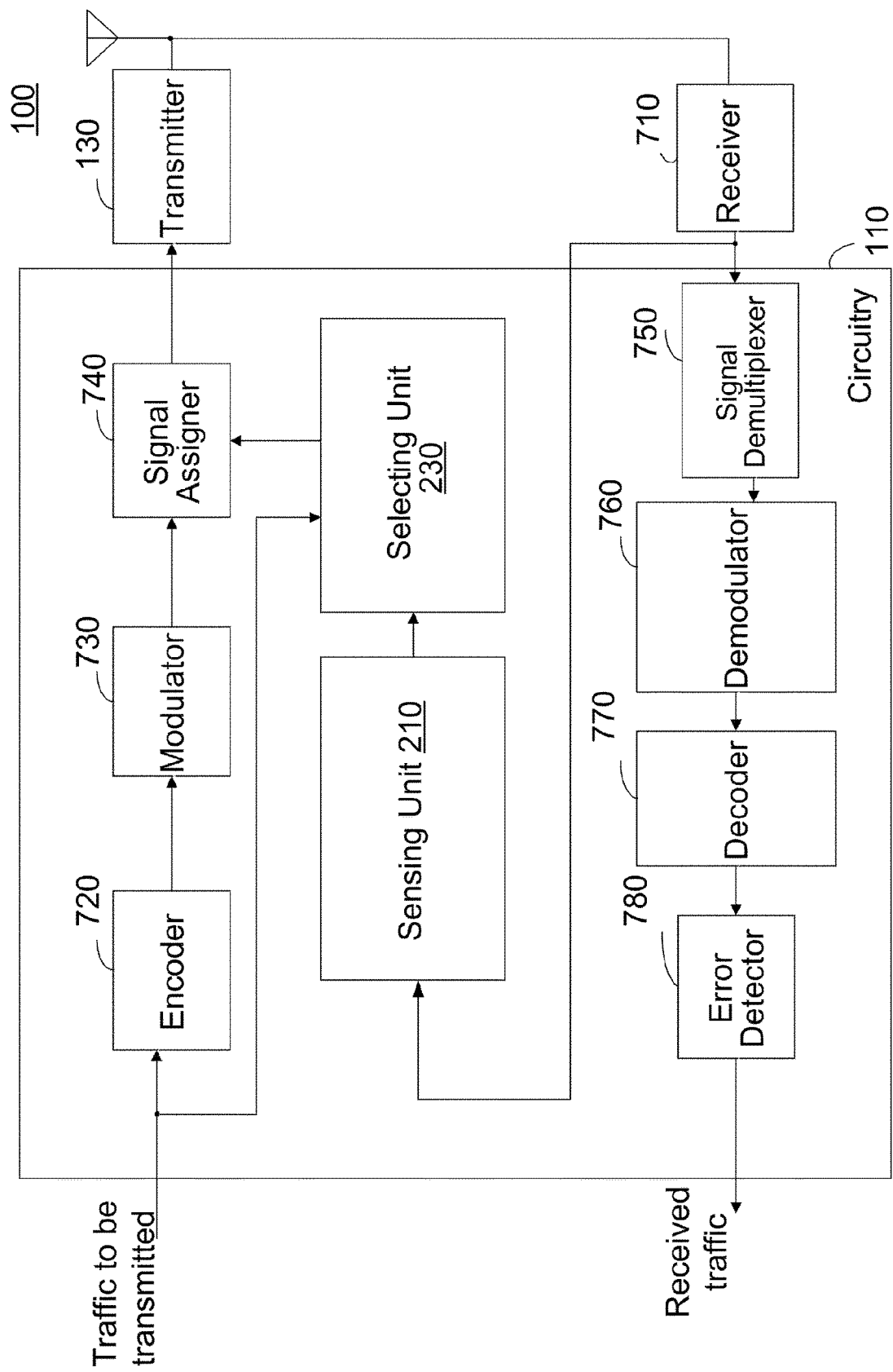
FIG. 7 schematically shows a detailed block diagram of a user equipment according to an embodiment of the present disclosure.

FIG. 7 schematically shows a detailed block diagram of a user equipment 100 according to an embodiment of the present disclosure.

As shown in FIG. 7, the UE 100 includes an encoder 720, a modulator 730, a signal assigner 740, a signal demultiplexer 750, a demodulator 760, a decoder 770, an error detector 780, the sensing unit 210, the selecting unit 230, the transmitter 130, and a receiver 710.

The same reference numbers are used in FIG. 7 for indicating the same elements as shown in FIG. 1 and FIG. 2. To avoid having the description become complex, in this case, the constituent elements related to the transmission of traffic, which are closely connected with the features of the present embodiment, are mainly shown.

The encoder 720 encodes the traffic to be transmitted to obtain the encoded signal, the modulator 730 modulates the encoded signal to obtain the modulated signal, the signal assigner 740 assigns resources for the modulated signal according to the output result from the circuitry, e.g., from the selecting unit 230 based on the type of the traffic. And the transmitter 130 transmits the signal indicative of the traffic.

In one embodiment, depending on the type of the traffic, the sensing unit 210 senses multiple resources within a transmission resource pool during a sensing window, and the selecting unit 230 selects one or more resources from the transmission resource pool during a resource selection window according to a sensing result in the sensing window, wherein one or more of the sensing window and the resource selection window is configured, preconfigured, or specified according to a type of traffic. More specifically, the sensing unit 210 senses the resources according to embodiments of the present disclosure (the detailed operations with references to FIGS. 3-6, the details thereof are omitted for the purpose of clarity and brevity), and the selecting unit 230 selects resources according to embodiments of the present disclosure (the detailed operations with references to FIGS. 3-6, the details thereof are omitted for the purpose of clarity and brevity). The selected resources output to the signal assigner 740 are used for transmitting corresponding type of traffic.

The receiver 710 receives traffic from the antenna. The signal demultiplexer 750 demultiplexes the received traffic by Fast Fourier Transform (FFT) and sends the demultiplexed traffic to the demodulator 760. The demodulator 760 demodulates the demultiplexed traffic to generate demodulated traffic. The decoder 770 decodes the demodulated traffic, and the error detector 780 performs checking procedure (e.g., Cyclic Redundancy Check, CRC) to check the received traffic.

In one embodiment, the receiver 710 sends the received traffic to the circuitry 110 for determining the type of the traffic, so as to determine the sensing and selecting schemes that may be performed on the traffic.

To be noted that although FIG. 7 shows the parts, i.e., the encoder 720, the modulator 730, the signal assigner 740, the signal demultiplexer 750, the demodulator 760, the decoder 770, and the error detector 780 are within the circuitry 110, this is only an example, but not a limitation, in fact, for example, one or more of the integrated parts may be separated from the circuitry 110 depending on requirements of the communication apparatus.

To be noted that although FIG. 7 shows the sensing unit 210, the selecting unit 230 in separate units, this is only an example, but not a limitation. For example, they may be within a unit or integrated with each other as an integrated circuit, or they may be in other forms.

Figure 8:
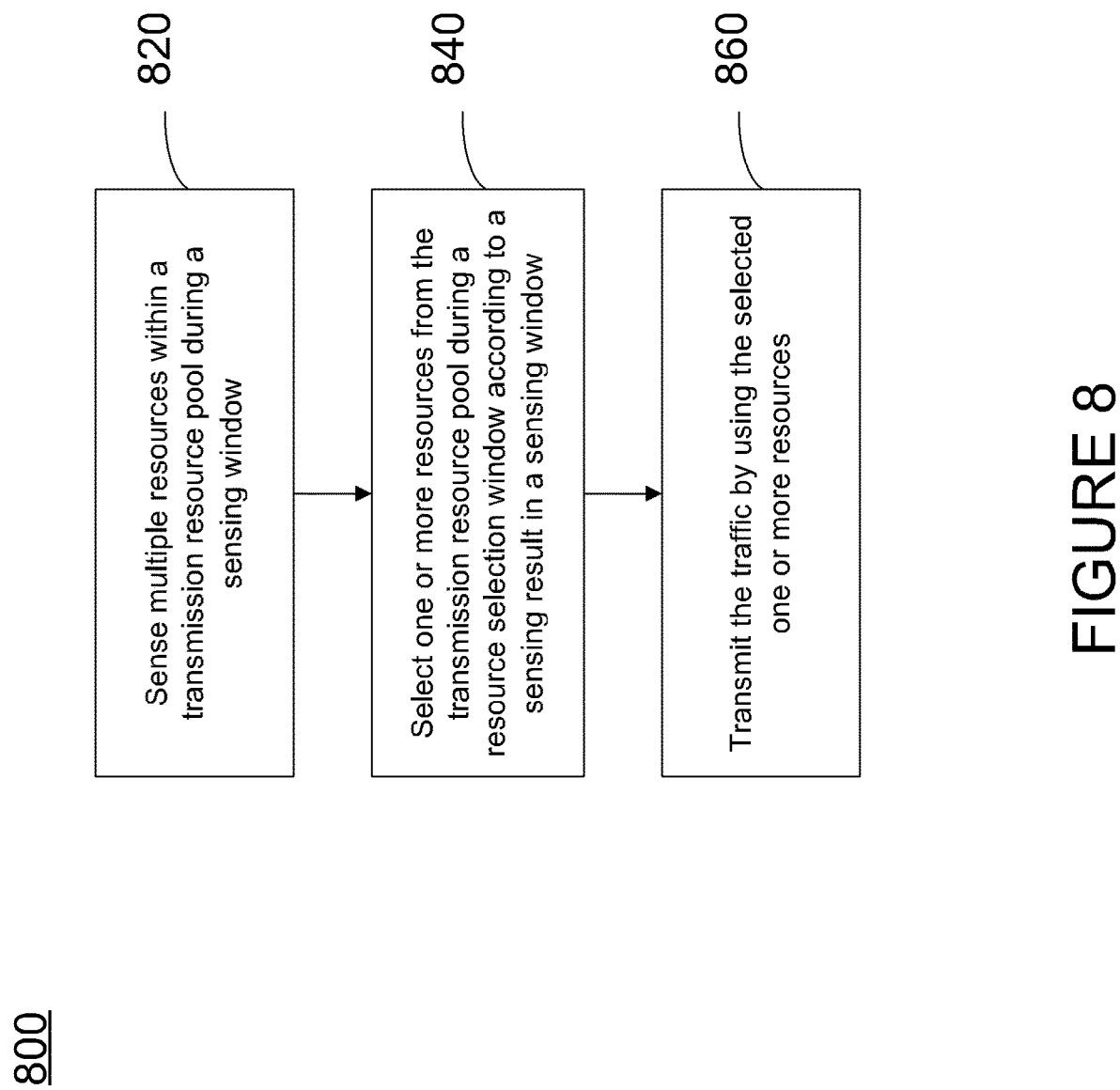
FIG. 8 schematically shows a flowchart of a communication method according to an embodiment of the present disclosure.

FIG. 8 schematically shows a flowchart 800 of a communication method according to an embodiment of the present disclosure. Although specific steps are disclosed in FIG. 8, such steps are exemplary. That is, the present disclosure is well suited to performing various other steps or variations of the steps recited in FIG. 8. FIG. 8 is described with references to FIG. 1-FIG. 7.

In block 820, multiple resources within a transmission resource pool is sensed by UE 100 during a sensing window.

In block 840, one or more resources from the transmission resource pool is selected by UE 100 during a resource selection window according to a sensing result in a sensing window. In one embodiment, one or more of the sensing window and the resource selection window is configured, preconfigured, or specified according to a type of traffic.

In one embodiment, different types of traffic include a first type of traffic and a second type of traffic. A first sensing window and a second sensing window are configured, preconfigured or specified for a first type of traffic and a second type of traffic, respectively, and a first resource selection window and a second resource selection window are configured, preconfigured, or specified for the first type of traffic and the second type of traffic, respectively.

In an embodiment, a time duration of the second sensing window is shorter than that of the first sensing window, and a time duration of the second resource selection window is shorter than that of the first resource selection window.

In an embodiment, the first type of traffic comprises periodic traffic, and the second type of traffic comprises aperiodic traffic.

In an embodiment, the sensing window and the second sensing window are overlapped when both of the first type of traffic and the second type of traffic are triggered simultaneously.

In an embodiment, the first resource selection window and the resource second selection window are configured, preconfigured or specified according to one or more of the following schemes when both of the first type of traffic and the second type of traffic are triggered: (a) scheme in which the first resource selection window and the second resource selection window are Time-Division Multiplexed (TDMed), wherein the second resource selection window is earlier than the first resource selection window; (b) a scheme in which the first resource selection window and the second resource selection window are Frequency-Division Multiplexed (FDMed); (c) a scheme in which the first resource selection window and the second resource selection window are Code-Division Multiplexed (CDMed); and (d) a scheme in which a priority for selecting resources in the first resource selection window and in the second resource selection window is configured, preconfigured, or specified according to priorities of the first type of traffic and the second type of traffic.

In an embodiment, for the first type of traffic, Physical Sidelink Control Channel (PSCCH) is decoded and Reference Signal Received Power (RSRP) of Physical Sidelink Shared Channel (PSSCH) is measured by the sensing unit 210 during the first sensing window, and measurement, e.g., on energy of symbols, is performed by the sensing unit 210 to obtain first measured Sidelink Received Signal Strength Indicator (S-RSSI) during the first sensing window.

In an embodiment, for the first type of traffic, one or more resources are excluded by the resource selection window 230 to obtain one or more available resources for transmitting the first type of traffic according to the measured RSRP sensed by the sensing unit 210 in the first sensing window and the obtained available resources is ranked by the resource selection window 230 according to the first measured S-RSSI during the first resource selection window. And the a certain ratio of highest ranked candidate resources (e.g., 20% of total candidate resources) is reported by the selecting unit 230 to a higher layer which selects one or more resources among the ranked candidate resources for transmitting the first type of traffic.

In an embodiment, for the second type of traffic, PSCCH is decoded and RSRP of PSSCH is measured by the sensing unit 210 during the first sensing window, and measurement is performed by the sensing unit 210 to obtain second measured S-RSSI during the second sensing window.

In an embodiment, for the second type of traffic, one or more resources are excluded by the resource selection window 230 to obtain one or more available resources for transmitting the second type of traffic according to the measured RSRP sensed by the sensing unit 210 in the first sensing window and the obtained available resources is ranked by the resource selection window 230 according to the second measured S-RSSI during the second resource selection window. And a certain ratio of highest ranked candidate resources (e.g., 20% of total candidate resources) is reported by the selecting unit 230 to a higher layer which selects one or more resources among the ranked candidate resources for transmitting the second type of traffic.

In block 860, the traffic is transmitted by the UE 100 using the selected one or more resources.

Moreover, in an embodiment, the transmission resource pool is configured or preconfigured with one or more of the following configurations: (a) a configuration in which a first transmission resource pool and a second transmission resource pool respectively for the first type of traffic and the second type of traffic are shared, wherein the first type of traffic and the second type of traffic comprise periodic traffic and aperiodic traffic, respectively; (b) a configuration in which the first transmission resource pool and the second transmission resource pool respectively for the first type of traffic and the second type of traffic are separated, wherein the first type of traffic and the second type of comprise periodic traffic and aperiodic traffic, respectively; (c) a configuration in which a first transmission resource pool and a second transmission resource pool respectively for a first transmission mode of traffic and a second transmission mode of traffic respectively are separated, wherein transmission mode comprise one or more of broadcast, unicast, and multicast; (d) a configuration in which a first transmission resource pool for a first carrier for transmitting one or more traffic and a second transmission resource pool for a second carrier for transmitting one or more traffic are separated; (e) a configuration in which a first transmission resource pool for a first zone in which a first transmission mode of traffic is transmitted via sidelink and a second transmission resource pool in a second zone in which a second transmission mode of traffic is transmitted via sidelink are separated.

Figure 9:
FIG. 9 schematically shows an example of logically continuous subframes that LBT is applied according to an embodiment of the present disclosure.

FIG. 9 schematically shows an example of logically continuous subframes that LBT is applied according to an embodiment of the present disclosure.

In an embodiment, Listen before talk (LBT) may be applied in logically V2X subframes. For example, as shown in the example of FIG. 9, subframes 1, 2, 3, and 4 which are logically continuous may apply LBT for sensing resources. In another embodiment, LBT may be applied per resource candidate instead of only in time domain like in LAA (Licensed Assisted Access).

Figure 10:
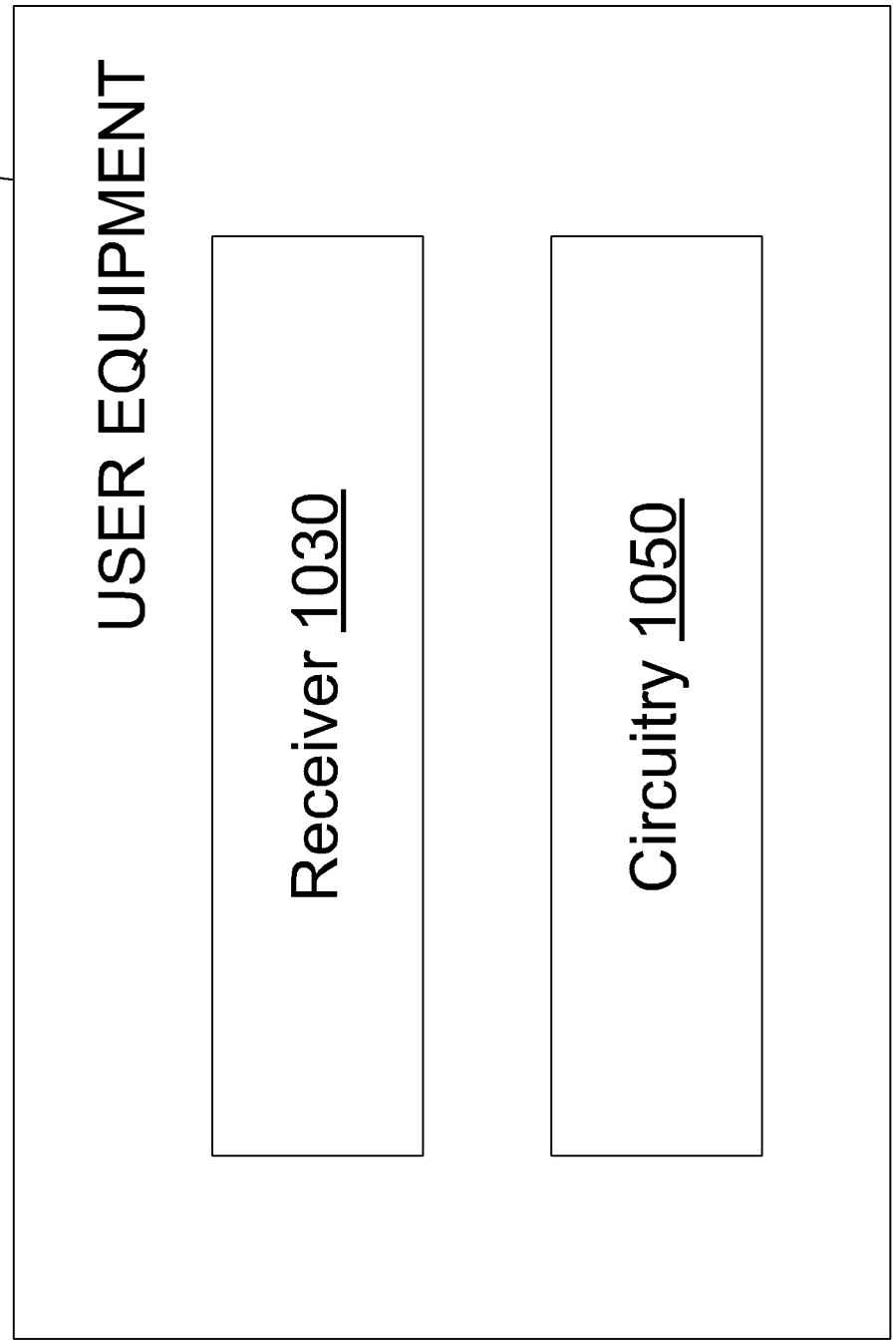
FIG. 10 illustrates a block diagram of a user equipment according to an embodiment of the present disclosure.

FIG. 10 illustrates a block diagram of a user equipment 1000 according to an embodiment of the present disclosure. The UE 1000 includes a receiver 1030 that receives traffic and circuitry 1050 that may decode the received traffic. For example, the circuitry 1015 may receive the traffic from the receiver 1030, demultiplex the received traffic, e.g., by Fast Fourier Transform (FFT), demodulate the demultiplexed traffic to generate demodulated traffic, decode the demodulated traffic, and perform checking procedure (e.g., Cyclic Redundancy Check, CRC) to check the received traffic.

In an embodiment, the received traffic is transmitted by using one or more resources that are selected from a transmission resource pool by the circuitry 110 in the UE 100 during a resource selection according to a sensing result in a sensing window, and the sensing result is generated by sensing a plurality of resources within the transmission resource pool during the sensing window by the circuitry 110 of the UE 100. In an embodiment, one or more of the sensing window and the resource selection window is configured, preconfigured, or specified according to a type of the traffic.

In one embodiment, different types of traffic include a first type of traffic and a second type of traffic. A first sensing window and a second sensing window are configured, preconfigured or specified for a first type of traffic and a second type of traffic, respectively, and a first resource selection window and a second resource selection window are configured, preconfigured, or specified for the first type of traffic and the second type of traffic, respectively.

In an embodiment, a time duration of the second sensing window is shorter than that of the first sensing window, and a time duration of the second resource selection window is shorter than that of the first resource selection window.

In an embodiment, the first type of traffic comprises periodic traffic, and the second type of traffic comprises aperiodic traffic.

In an embodiment, the sensing window and the second sensing window are overlapped when both of the first type of traffic and the second type of traffic are triggered simultaneously.

In an embodiment, the first resource selection window and the resource second selection window are configured, preconfigured or specified according to one or more of the following schemes when both of the first type of traffic and the second type of traffic are triggered: (a) scheme in which the first resource selection window and the second resource selection window are Time-Division Multiplexed (TDMed), wherein the second resource selection window is earlier than the first resource selection window; (b) a scheme in which the first resource selection window and the second resource selection window are Frequency-Division Multiplexed (FDMed); (c) a scheme in which the first resource selection window and the second resource selection window are Code-Division Multiplexed (CDMed); and (d) a scheme in which a priority for selecting resources in the first resource selection window and in the second resource selection window is configured, preconfigured, or specified according to priorities of the first type of traffic and the second type of traffic.

In an embodiment, as mentioned above with reference to FIG. 2, for the first type of traffic, Physical Sidelink Control Channel (PSCCH) is decoded and Reference Signal Received Power (RSRP) of Physical Sidelink Shared Channel (PSSCH) is measured by the sensing unit 210 during the first sensing window, and measurement, e.g., on energy of symbols, is performed by the sensing unit 210 to obtain the first measured Sidelink Received Signal Strength Indicator (S-RSSI) during the first sensing window.

In an embodiment, as mentioned above with reference to FIG. 2, for the first type of traffic, one or more resources are excluded by the resource selection window 230 to obtain one or more available resources for transmitting the first type of traffic according to the measured RSRP sensed by the sensing unit 210 in the first sensing window and the obtained available resources is ranked by the resource selection window 230 according to the first measured S-RSSI during the first resource selection window. And a certain ratio of highest ranked candidate resources (e.g., 20% of total candidate resources) is reported by the selecting unit 230 to a higher layer which selects one or more resources among the ranked candidate resources for transmitting the first type of traffic.

In an embodiment, as mentioned above with reference to FIG. 2, for the second type of traffic, PSCCH is decoded and RSRP of PSSCH is measured by the sensing unit 210 during the first sensing window, and measurement is performed by the sensing unit 210 to obtain second measured S-RSSI during the second sensing window.

In an embodiment, as mentioned above with reference to FIG. 2, for the second type of traffic, one or more resources are excluded by the resource selection window 230 to obtain one or more available resources for transmitting the second type of traffic according to the measured RSRP sensed by the sensing unit 210 in the first sensing window and the obtained available resources is ranked by the resource selection window 230 according to the second measured S-RSSI during the second resource selection window. And a certain ratio of highest ranked candidate resources (e.g., 20% of total candidate resources) is reported by the selecting unit 230 to a higher layer which selects one or more resources among the ranked candidate resources for transmitting the second type of traffic.

The traffic is transmitted by the UE 100 to the UE 1000 using the selected one or more resources.

Moreover, in an embodiment, the transmission resource pool is configured or preconfigured with one or more of the following configurations: (a) a configuration in which a first transmission resource pool and a second transmission resource pool respectively for the first type of traffic and the second type of traffic are shared, wherein the first type of traffic and the second type of traffic comprise periodic traffic and aperiodic traffic, respectively; (b) a configuration in which the first transmission resource pool and the second transmission resource pool respectively for the first type of traffic and the second type of traffic are separated, wherein the first type of traffic and the second type of comprise periodic traffic and aperiodic traffic, respectively; (c) a configuration in which a first transmission resource pool and a second transmission resource pool respectively for a first transmission mode of traffic and a second transmission mode of traffic respectively are separated, wherein transmission mode comprise one or more of broadcast, unicast, and multicast; (d) a configuration in which a first transmission resource pool for a first carrier for transmitting one or more traffic and a second transmission resource pool for a second carrier for transmitting one or more traffic are separated; (e) a configuration in which a first transmission resource pool for a first zone in which a first transmission mode of traffic is transmitted via sidelink and a second transmission resource pool in a second zone in which a second transmission mode of traffic is transmitted via sidelink are separated.

Figure 11:
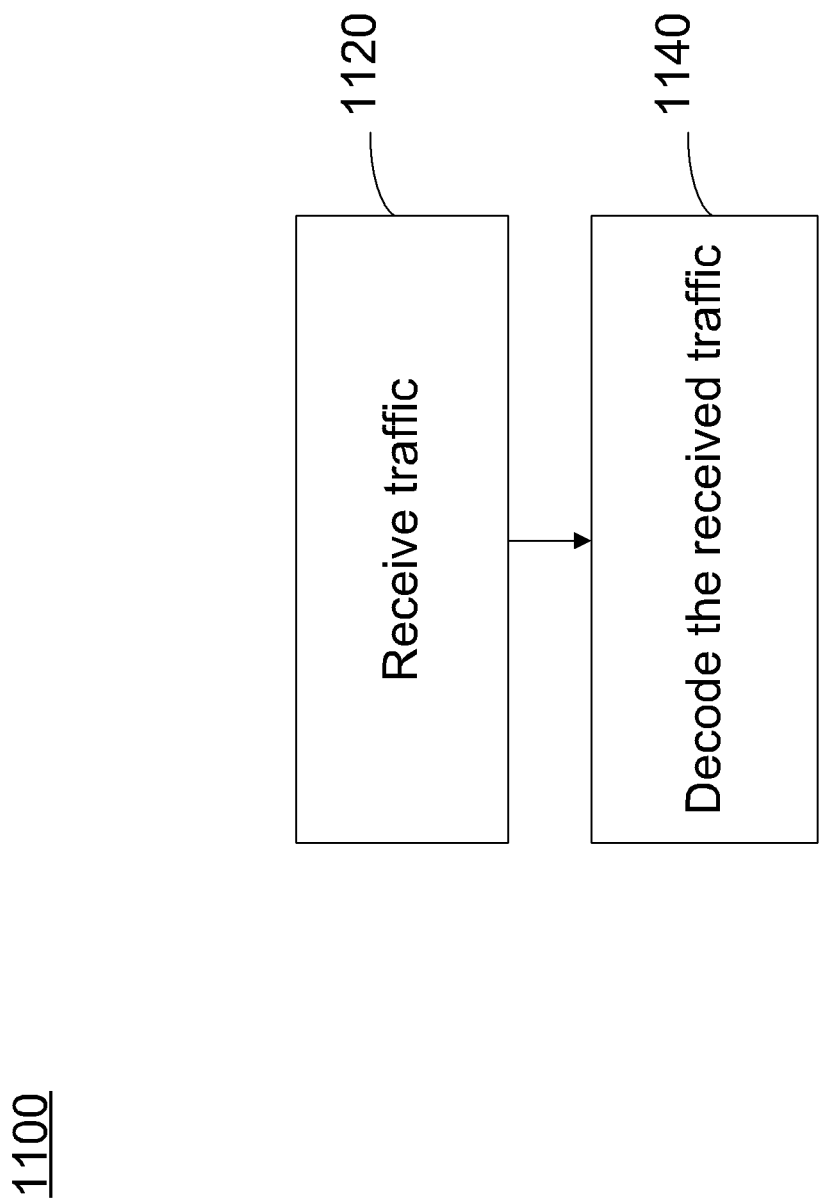
FIG. 11 schematically shows a flowchart of a communication method according to an embodiment of the present disclosure.

FIG. 11 schematically shows a flowchart of a communication method according to an embodiment of the present disclosure. In an embodiment, the communication method may be performed by the UE 1000 to receive traffic, e.g., from UE 100. Although specific steps are disclosed in FIG. 11, such steps are exemplary. That is, the present disclosure is well suited to performing various other steps or variations of the steps recited in FIG. 11.

More specifically, in block 1120, the traffic is received by the receiver 1030 of the UE 1000. In block 1140, the received traffic is decoded by circuitry 1050 of the UE 1000. In one embodiment, the received traffic is transmitted by using one or more resources that are selected from a transmission resource pool during a resource selection according to a sensing result in a sensing window, and wherein the sensing result is generated by sensing a plurality of resources within the transmission resource pool during the sensing window, and wherein one or more of the sensing window and the resource selection window is configured, preconfigured, or specified according to a type of the traffic.

In an embodiment, a first sensing window and a second sensing window are configured, preconfigured, or specified for a first type of traffic and a second type of traffic, respectively, and wherein a first resource selection window and a second resource selection window are configured, preconfigured, or specified for the first type of traffic and the second type of traffic, respectively.

In an embodiment, a time duration of the second sensing window is shorter than that of the first sensing window, and wherein a time duration of the second resource selection window is shorter than that of the first resource selection window.

In an embodiment, for the first type of traffic, Physical Sidelink Control Channel (PSCCH) is decoded and Reference Signal Received Power (RSRP) of Physical Sidelink Shared Channel (PSSCH) is measured during the first sensing window, and measurement is performed to obtain first measured Sidelink Received Signal Strength Indicator (S-RSSI) during the first sensing window, and wherein for the first type of traffic, one or more resources are excluded to obtain one or more available resources for transmitting the first type of traffic according to the measured RSRP in the first sensing window and the obtained available resources are ranked according to the first measured S-RSSI during the first resource selection window.

In an embodiment, for the second type of traffic, PSCCH is decoded and RSRP of PSSCH is measured during the first sensing window, and measurement is performed to obtain second measured S-RSSI during the second sensing window, and wherein for the second type of traffic, one or more resources are excluded to obtain one or more available resources for transmitting the second type of traffic according to the measured RSRP in the first sensing window and the obtained available resources are ranked according to the second measured S-RSSI during the second resource selection window.

In an embodiment, the first sensing window and the second sensing window are overlapped when both of the first type of traffic and the second type of traffic are triggered simultaneously.

In an embodiment, the first resource selection window and the resource second selection window are configured, preconfigured, or specified according to one or more of the following schemes when both of the first type of traffic and the second type of traffic are triggered: a scheme in which the first resource selection window and the second resource selection window are Time-Division Multiplexed (TDMed), wherein the second resource selection window is earlier than the first resource selection window; a scheme in which the first resource selection window and the second resource selection window are Frequency-Division Multiplexed (FDMed); a scheme in which the first resource selection window and the second resource selection window are Code-Division Multiplexed (CDMed); and a scheme in which a priority for selecting resources in the first resource selection window and in the second resource selection window is configured, preconfigured, or specified according to priorities of the first type of traffic and the second type of traffic.

In an embodiment, the first type of traffic comprises periodic traffic, and the second type of traffic comprises aperiodic traffic.

In an embodiment, the transmission resource pool is configured or preconfigured with one or more of the following configurations: a configuration in which a first transmission resource pool and a second transmission resource pool respectively for the first type of traffic and the second type of traffic are shared, wherein the first type of traffic and the second type of traffic comprise periodic traffic and aperiodic traffic, respectively; a configuration in which the first transmission resource pool and the second transmission resource pool respectively for the first type of traffic and the second type of traffic are separated, wherein the first type of traffic and the second type of comprise periodic traffic and aperiodic traffic, respectively; a configuration in which a first transmission resource pool and a second transmission resource pool respectively for a first transmission mode of traffic and a second transmission mode of traffic respectively are separated, wherein transmission mode comprise one or more of broadcast, unicast, and multicast; a configuration in which a first transmission resource pool for a first carrier for transmitting one or more traffic and a second transmission resource pool for a second carrier for transmitting one or more traffic are separated; and a configuration in which a first transmission resource pool for a first zone in which a first transmission mode of traffic is transmitted via sidelink and a second transmission resource pool for a second zone in which a second transmission mode of traffic is transmitted via sidelink are separated.

The sensing procedure and the selecting procedure have been described with references to FIG. 1-FIG. 8, and the configuration of the transmission resource pools and the configuration of the sensing windows and the resource selection windows as mentioned above may be applied thereto, thus, the detailed description will be omitted herein for the purposes of clarity and brevity.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A user equipment, comprising:
circuitry, operative to sense a plurality of resources within a transmission resource pool during a sensing window, and select one or more resources from the transmission resource pool during a resource selection window according to a sensing result in the sensing window, wherein one or more of the sensing window and the resource selection window is configured, preconfigured, or specified according to a type of traffic; and
a transmitter, operative to transmit the traffic by using the selected one or more resources.

(2). The user equipment according to (1), wherein a first sensing window and a second sensing window are configured, preconfigured, or specified for a first type of traffic and a second type of traffic, respectively, and wherein a first resource selection window and a second resource selection window are configured, preconfigured, or specified for the first type of traffic and the second type of traffic, respectively.

(3). The user equipment according to (2), wherein a time duration of the second sensing window is shorter than that of the first sensing window, and wherein a time duration of the second resource selection window is shorter than that of the first resource selection window.

(4). The user equipment according to (2), wherein the circuitry further comprises a sensing unit and a selecting unit,
wherein for the first type of traffic, the sensing unit is operative to decode Physical Sidelink Control Channel (PSCCH) and measure Reference Signal Received Power (RSRP) of Physical Sidelink Shared Channel (PSSCH) during the first sensing window, and operative to perform measurement to obtain first measured Sidelink Received Signal Strength Indicator (S-RSSI) during the first sensing window, and
wherein for the first type of traffic, the selecting unit is operative to exclude one or more resources to obtain one or more available resources for transmitting the first type of traffic according to the measured RSRP sensed during the first sensing window and rank the obtained available resources according to the first measured S-RSSI during the first resource selection window.

(5). The user equipment according to (4), wherein for the second type of traffic, the sensing unit is operative to decode PSCCH and measure RSRP of PSSCH during the first sensing window, and operative to perform measurement to obtain second measured S-RSSI during the second sensing window, and
wherein for the second type of traffic, the selecting unit is operative to exclude one or more resources to obtain one or more available resources for transmitting the second type of traffic according to the measured RSRP sensed during the first sensing window and rank the obtained available resources according to the second measured S-RSSI during the second resource selection window.

(6). The user equipment according to (2), wherein the first sensing window and the second sensing window are overlapped when both of the first type of traffic and the second type of traffic are triggered simultaneously.

(7). The user equipment according to (2), wherein the first resource selection window and the resource second selection window are configured, preconfigured, or specified according to one or more of the following schemes when both of the first type of traffic and the second type of traffic are triggered:
a scheme in which the first resource selection window and the second resource selection window are Time-Division Multiplexed (TDMed), wherein the second resource selection window is earlier than the first resource selection window;

a scheme in which the first resource selection window and the second resource selection window are Frequency-Division Multiplexed (FDMed);

a scheme in which the first resource selection window and the second resource selection window are Code-Division Multiplexed (CDMed); and a scheme in which a priority for selecting resources in the first resource selection window and in the second resource selection window is configured, preconfigured, or specified according to priorities of the first type of traffic and the second type of traffic.

(8). The user equipment according to (2), wherein the first type of traffic comprises periodic traffic, and the second type of traffic comprises aperiodic traffic.

(9). The user equipment according to (1), wherein the transmission resource pool is configured or preconfigured with one or more of the following configurations:

a configuration in which a first transmission resource pool and a second transmission resource pool respectively for the first type of traffic and the second type of traffic are shared, wherein the first type of traffic and the second type of traffic comprise periodic traffic and aperiodic traffic, respectively;

a configuration in which the first transmission resource pool and the second transmission resource pool respectively for the first type of traffic and the second type of traffic are separated, wherein the first type of traffic and the second type of comprise periodic traffic and aperiodic traffic, respectively;

a configuration in which a first transmission resource pool and a second transmission resource pool respectively for a first transmission mode of traffic and a second transmission mode of traffic respectively are separated, wherein transmission mode comprise one or more of broadcast, unicast, and multicast;

a configuration in which a first transmission resource pool for a first carrier for transmitting one or more traffic and a second transmission resource pool for a second carrier for transmitting one or more traffic are separated; and a configuration in which a first transmission resource pool for a first zone in which a first transmission mode of traffic is transmitted via sidelink and a second transmission resource pool for a second zone in which a second transmission mode of traffic is transmitted via sidelink are separated.

(10). A communication method, comprising:

sensing a plurality of resources within a transmission resource pool during a sensing window;

selecting one or more resources from the transmission resource pool during a resource selection window according to a sensing result in the sensing window, wherein one or more of the sensing window and the resource selection window is configured, preconfigured, or specified according to a type of traffic; and transmitting the traffic by using the selected one or more resources.

(11). The communication method according to (10), wherein a first sensing window and a second sensing window are configured, preconfigured, or specified for a first type of traffic and a second type of traffic, respectively, and wherein a first resource selection window and a second resource selection window are configured, preconfigured, or specified for the first type of traffic and the second type of traffic, respectively.

(12). The communication method according to (11), wherein a time duration of the second sensing window is shorter than that of the second sensing window, and wherein a time duration of the second resource selection window is shorter than that of the first resource selection window.

(13). The communication method according to (11), wherein for the first type of traffic, the step of sensing comprises:

decoding Physical Sidelink Control Channel (PSCCH) and measuring Reference Signal Received Power (RSRP) of Physical Sidelink Shared Channel (PSSCH) during the first sensing window, and performing measurement to obtain first measured Sidelink Received Signal Strength Indicator (S-RSSI) during the first sensing window, and wherein for the first type of traffic, the step of selecting comprising:

excluding one or more resources to obtain one or more available resources for transmitting the first type of traffic according to the measured RSRP in the first sensing window and ranking the obtained available resources according to the first measured S-RSSI during the first resource selection window.

(14). The communication method according to (11), wherein for the second type of traffic, the step of sensing comprises:

decoding PSCCH and measuring RSRP of PSSCH during the first sensing window, and performing measurement to obtain second measured S-RSSI during the second sensing window, and wherein for the second type of traffic, the step of selecting further comprising:

excluding one or more resources to obtain one or more available resources for transmitting the second type of traffic according to the measured RSRP in the first sensing window and ranking the obtained available resources according to the second measured S-RSSI during the second resource selection window.

(15). The communication method according to (11), wherein the first sensing window and the second sensing window are overlapped when both of the first type of traffic and the second type of traffic are triggered simultaneously.

(16). The communication method according to (11), wherein the first resource selection window and the resource second selection window are configured, preconfigured, or specified according to one or more of the following schemes when both of the first type of traffic and the second type of traffic are triggered:

a scheme in which the first resource selection window and the second resource selection window are Time-Division Multiplexed (TDMed), wherein the second resource selection window is earlier than the first resource selection window;

a scheme in which the first resource selection window and the second resource selection window are Frequency-Division Multiplexed (FDMed);

a scheme in which the first resource selection window and the second resource selection window are Code-Division Multiplexed (CDMed); and a scheme in which a priority for selecting resources in the first resource selection window and in the second resource selection window is configured, preconfigured, or specified according to priorities of the first type of traffic and the second type of traffic.

(17). The communication method according to (11), wherein the first type of traffic comprises periodic traffic, and the second type of traffic comprises aperiodic traffic.

(18). The communication method according to (10), wherein the transmission resource pool is configured or preconfigured with one or more of the following configurations:

a configuration in which a first transmission resource pool and a second transmission resource pool respectively for the first type of traffic and the second type of traffic are shared, wherein the first type of traffic and the second type of traffic comprise periodic traffic and aperiodic traffic, respectively;

a configuration in which the first transmission resource pool and the second transmission resource pool respectively for the first type of traffic and the second type of traffic are separated, wherein the first type of traffic and the second type of comprise periodic traffic and aperiodic traffic, respectively;

a configuration in which a first transmission resource pool and a second transmission resource pool respectively for a first transmission mode of traffic and a second transmission mode of traffic respectively are separated, wherein transmission mode comprise one or more of broadcast, unicast, and multicast;

a configuration in which a first transmission resource pool for a first carrier for transmitting one or more traffic and a second transmission resource pool for a second carrier for transmitting one or more traffic are separated; and a configuration in which a first transmission resource pool for a first zone in which a first transmission mode of traffic is transmitted via sidelink and a second transmission resource pool for a second zone in which a second transmission mode of traffic is transmitted via sidelink are separated.

(19). A user equipment, comprising:
a receiver, operative to receive traffic; and
circuitry, operative to decode the received traffic,
wherein the received traffic is transmitted using one or more resources that are selected from a transmission resource pool during a resource selection according to a sensing result in a sensing window, and wherein the sensing result is generated by sensing a plurality of resources within the transmission resource pool during the sensing window, and
wherein one or more of the sensing window and the resource selection window is configured, preconfigured, or specified according to a type of the traffic.

(20). The user equipment according to (19), wherein a first sensing window and a second sensing window are configured, preconfigured, or specified for a first type of traffic and a second type of traffic, respectively, and wherein a first resource selection window and a second resource selection window are configured, preconfigured, or specified for the first type of traffic and the second type of traffic, respectively.

(21). The user equipment according to (20), wherein a time duration of the second sensing window is shorter than that of the first sensing window, and wherein a time duration of the second resource selection window is shorter than that of the first resource selection window.

(22). The user equipment according to (20), wherein for the first type of traffic, Physical Sidelink Control Channel (PSCCH) is decoded and Reference Signal Received Power (RSRP) of Physical Sidelink Shared Channel (PSSCH) is measured during the first sensing window, and measurement is performed to obtain first measured Sidelink Received Signal Strength Indicator (S-RSSI) during the first sensing window, and wherein for the first type of traffic, one or more resources are excluded to obtain one or more available resources for transmitting the first type of traffic according to the measured RSRP in the first sensing window and the obtained available resources are ranked according to the first measured S-RSSI during the first resource selection window.

(23). The user equipment according to (22), wherein for the second type of traffic, PSCCH is decoded and RSRP of PSSCH is measured during the first sensing window, and measurement is performed to obtain second measured S-RSSI during the second sensing window, and wherein for the second type of traffic, one or more resources are excluded to obtain one or more available resources for transmitting the second type of traffic according to the measured RSRP in the first sensing window and the obtained available resources are ranked according to the second measured S-RSSI during the second resource selection window.

(24). The user equipment according to (20), wherein the first sensing window and the second sensing window are overlapped when both of the first type of traffic and the second type of traffic are triggered simultaneously.

(25). The user equipment according to (20), wherein the first resource selection window and the resource second selection window are configured, preconfigured, or specified according to one or more of the following schemes when both of the first type of traffic and the second type of traffic are triggered:

a scheme in which the first resource selection window and the second resource selection window are Time-Division Multiplexed (TDMed), wherein the second resource selection window is earlier than the first resource selection window;

a scheme in which the first resource selection window and the second resource selection window are Frequency-Division Multiplexed (FDMed);

a scheme in which the first resource selection window and the second resource selection window are Code-Division Multiplexed (CDMed); and a scheme in which a priority for selecting resources in the first resource selection window and in the second resource selection window is configured, preconfigured, or specified according to priorities of the first type of traffic and the second type of traffic.

(26). The user equipment according to (20), wherein the first type of traffic comprises periodic traffic, and the second type of traffic comprises aperiodic traffic.

(27). The user equipment according to (19), wherein the transmission resource pool is configured or preconfigured with one or more of the following configurations:

a configuration in which a first transmission resource pool and a second transmission resource pool respectively for the first type of traffic and the second type of traffic are shared, wherein the first type of traffic and the second type of traffic comprise periodic traffic and aperiodic traffic, respectively;

a configuration in which the first transmission resource pool and the second transmission resource pool respectively for the first type of traffic and the second type of traffic are separated, wherein the first type of traffic and the second type of comprise periodic traffic and aperiodic traffic, respectively;

a configuration in which a first transmission resource pool and a second transmission resource pool respectively for a first transmission mode of traffic and a second transmission mode of traffic respectively are separated, wherein transmission mode comprise one or more of broadcast, unicast, and multicast;

a configuration in which a first transmission resource pool for a first carrier for transmitting one or more traffic and a second transmission resource pool for a second carrier for transmitting one or more traffic are separated;

a configuration in which a first transmission resource pool for a first zone in which a first transmission mode of traffic is transmitted via sidelink and a second transmission resource pool for a second zone in which a second transmission mode of traffic is transmitted via sidelink are separated.

(28). A communication method, comprising:

receiving traffic; and decoding the received traffic, wherein the received traffic is transmitted by using one or more resources that are selected from a transmission resource pool during a resource selection according to a sensing result in a sensing window, and wherein the sensing result is generated by sensing a plurality of resources within the transmission resource pool during the sensing window, and wherein one or more of the sensing window and the resource selection window is configured, preconfigured, or specified according to a type of the traffic.

(29). The communication method according to (28), wherein a first sensing window and a second sensing window are configured, preconfigured, or specified for a first type of traffic and a second type of traffic, respectively, and wherein a first resource selection window and a second resource selection window are configured, preconfigured, or specified for the first type of traffic and the second type of traffic, respectively.

(30). The communication method according to (29), wherein a time duration of the second sensing window is shorter than that of the first sensing window, and wherein a time duration of the second resource selection window is shorter than that of the first resource selection window.

(31). The communication method according to (29), wherein for the first type of traffic, Physical Sidelink Control Channel (PSCCH) is decoded and Reference Signal Received Power (RSRP) of Physical Sidelink Shared Channel (PSSCH) is measured during the first sensing window, and measurement is performed to obtain first measured Sidelink Received Signal Strength Indicator (S-RSSI) during the first sensing window, and wherein for the first type of traffic, one or more resources are excluded to obtain one or more available resources for transmitting the first type of traffic according to the measured RSRP in the first sensing window and the obtained available resources are ranked according to the first measured S-RSSI during the first resource selection window.

(32). The communication method according to (31), wherein for the second type of traffic, PSCCH is decoded and RSRP of PSSCH is measured during the first sensing window, and measurement is performed to obtain second measured S-RSSI during the second sensing window, and wherein for the second type of traffic, one or more resources are excluded to obtain one or more available resources for transmitting the second type of traffic according to the measured RSRP in the first sensing window and the obtained available resources are ranked according to the second measured S-RSSI during the second resource selection window.

(33). The communication method according to (29), wherein the first sensing window and the second sensing window are overlapped when both of the first type of traffic and the second type of traffic are triggered simultaneously.

(34). The communication method according to (29), wherein the first resource selection window and the resource second selection window are configured, preconfigured, or specified according to one or more of the following schemes when both of the first type of traffic and the second type of traffic are triggered:

a scheme in which the first resource selection window and the second resource selection window are Time-Division Multiplexed (TDMed), wherein the second resource selection window is earlier than the first resource selection window;

a scheme in which the first resource selection window and the second resource selection window are Frequency-Division Multiplexed (FDMed);

a scheme in which the first resource selection window and the second resource selection window are Code-Division Multiplexed (CDMed); and a scheme in which a priority for selecting resources in the first resource selection window and in the second resource selection window is configured, preconfigured, or specified according to priorities of the first type of traffic and the second type of traffic.

(35). The communication method according to (29), wherein the first type of traffic comprises periodic traffic, and the second type of traffic comprises aperiodic traffic.

(36). The communication method according to (28), wherein the transmission resource pool is configured or preconfigured with one or more of the following configurations:

a configuration in which a first transmission resource pool and a second transmission resource pool respectively for the first type of traffic and the second type of traffic are shared, wherein the first type of traffic and the second type of traffic comprise periodic traffic and aperiodic traffic, respectively;

a configuration in which the first transmission resource pool and the second transmission resource pool respectively for the first type of traffic and the second type of traffic are separated, wherein the first type of traffic and the second type of comprise periodic traffic and aperiodic traffic, respectively;

a configuration in which a first transmission resource pool and a second transmission resource pool respectively for a first transmission mode of traffic and a second transmission mode of traffic respectively are separated, wherein transmission mode comprise one or more of broadcast, unicast, and multicast;

a configuration in which a first transmission resource pool for a first carrier for transmitting one or more traffic and a second transmission resource pool for a second carrier for transmitting one or more traffic are separated; and a configuration in which a first transmission resource pool for a first zone in which a first transmission mode of traffic is transmitted via sidelink and a second transmission resource pool for a second zone in which a second transmission mode of traffic is transmitted via sidelink are separated.

The invention claimed is:

1. A user equipment, comprising:
circuitry, operative to sense a plurality of resources within a transmission resource pool during a sensing window, and select one or more resources from the transmission resource pool during a resource selection window according to a sensing result in the sensing window, wherein one or more of the sensing window and the resource selection window is configured, preconfigured, or specified according to a type of traffic; and
a transmitter, operative to transmit the traffic by using the selected one or more resources, wherein a first sensing window is configured, preconfigured, or specified for a first type of traffic and a second sensing window is configured, preconfigured, or specified for a second type of traffic,
wherein a first resource selection window is configured, preconfigured, or specified for the first type of traffic and a second resource selection window is configured, preconfigured, or specified for the second type of traffic,
wherein a time duration of the second sensing window is shorter than that of the first sensing window, and a time duration of the second resource selection window is shorter than that of the first resource selection window,
wherein the first type of traffic includes periodic traffic, and the second type of traffic includes aperiodic traffic, and
wherein the first resource selection window and the resource second selection window are configured, preconfigured, or specified, when both of the first type of traffic and the second type of traffic are triggered, according to a scheme in which the first resource selection window and the second resource selection window are Time-Division Multiplexed (TDMed), wherein the second resource selection window is earlier than the first resource selection window.

2. The user equipment of claim 1, wherein the circuitry further comprises a sensing unit and a selecting unit,
wherein for the first type of traffic, the sensing unit is operative to decode Physical Sidelink Control Channel (PSCCH) and measure Reference Signal Received Power (RSRP) of Physical Sidelink Shared Channel (PSSCH) during the first sensing window, and operative to perform measurement to obtain first measured Sidelink Received Signal Strength Indicator (S-RSSI) during the first sensing window, and
wherein for the first type of traffic, the selecting unit is operative to exclude one or more resources to obtain one or more available resources for transmitting the first type of traffic according to the measured RSRP sensed during the first sensing window and rank the obtained available resources according to the first measured S-RSSI during the first resource selection window.

3. The user equipment of claim 2, wherein for the second type of traffic, the sensing unit is operative to decode PSCCH and measure RSRP of PSSCH during the first sensing window, and operative to perform measurement to obtain second measured S-RSSI during the second sensing window, and
wherein for the second type of traffic, the selecting unit is operative to exclude one or more resources to obtain one or more available resources for transmitting the second type of traffic according to the measured RSRP sensed during the first sensing window and rank the obtained available resources according to the second measured S-RSSI during the second resource selection window.

4. The user equipment of claim 1, wherein the first sensing window and the second sensing window are overlapped when both of the first type of traffic and the second type of traffic are triggered simultaneously.

5. The user equipment of claim 1, wherein the first resource selection window and the resource second selection window are configured, preconfigured, or specified according to one or more of the following additional schemes when both of the first type of traffic and the second type of traffic are triggered:
a scheme in which the first resource selection window and the second resource selection window are Frequency-Division Multiplexed (FDMed);
a scheme in which the first resource selection window and the second resource selection window are Code-Division Multiplexed (CDMed); and
a scheme in which a priority for selecting resources in the first resource selection window and in the second resource selection window is configured, preconfigured, or specified according to priorities of the first type of traffic and the second type of traffic.

6. The user equipment of claim 1, wherein the transmission resource pool is configured or preconfigured with one or more of the following configurations:
a configuration in which a first transmission resource pool and a second transmission resource pool respectively for the first type of traffic and the second type of traffic are shared, wherein the first type of traffic and the second type of traffic comprise periodic traffic and aperiodic traffic, respectively;
a configuration in which the first transmission resource pool and the second transmission resource pool respectively for the first type of traffic and the second type of traffic are separated, wherein the first type of traffic and the second type of comprise periodic traffic and aperiodic traffic, respectively;
a configuration in which a first transmission resource pool and a second transmission resource pool respectively for a first transmission mode of traffic and a second transmission mode of traffic respectively are separated, wherein transmission mode comprise one or more of broadcast, unicast, and multicast;
a configuration in which a first transmission resource pool for a first carrier for transmitting one or more traffic and a second transmission resource pool for a second carrier for transmitting one or more traffic are separated; and
a configuration in which a first transmission resource pool for a first zone in which a first transmission mode of traffic is transmitted via sidelink and a second transmission resource pool for a second zone in which a second transmission mode of traffic is transmitted via sidelink are separated.

7. A communication method, comprising: sensing a plurality of resources within a transmission resource pool during a sensing window;
selecting one or more resources from the transmission resource pool during a resource selection window according to a sensing result in the sensing window, wherein one or more of the sensing window and the resource selection window is configured, preconfigured, or specified according to a type of traffic; and transmitting the traffic by using the selected one or more resources, wherein a first sensing window is configured, preconfigured, or specified for a first type of traffic and a second sensing window is configured, preconfigured, or specified for a second type of traffic, wherein a first resource selection window is configured, preconfigured, or specified for the first type of traffic and a second resource selection window is configured, preconfigured, or specified for the second type of traffic, wherein a time duration of the second sensing window is shorter than that of the first sensing window, and a time duration of the second resource selection window is shorter than that of the first resource selection window, wherein the first type of traffic includes periodic traffic, and the second type of traffic includes aperiodic traffic, and wherein the first resource selection window and the resource second selection window are configured, preconfigured, or specified, when both of the first type of traffic and the second type of traffic are triggered, according to a scheme in which the first resource selection window and the second resource selection window are Time-Division Multiplexed (TDMed), wherein the second resource selection window is earlier than the first resource selection window.

8. The communication method of claim 7, wherein for the first type of traffic, the step of sensing comprises:

decoding Physical Sidelink Control Channel (PSCCH) and measuring Reference Signal Received Power (RSRP) of Physical Sidelink Shared Channel (PSSCH) during the first sensing window, and performing measurement to obtain first measured Sidelink Received Signal Strength Indicator (S-RSSI) during the first sensing window, and wherein for the first type of traffic, the step of selecting comprising: excluding one or more resources to obtain one or more available resources for transmitting the first type of traffic according to the measured RSRP in the first sensing window and ranking the obtained available resources according to the first measured S-RSSI during the first resource selection window.

9. The communication method of claim 8, wherein for the second type of traffic, the step of sensing comprises:

decoding PSCCH and measuring RSRP of PSSCH during the first sensing window, and performing measurement to obtain second measured S-RSSI during the second sensing window, and wherein for the second type of traffic, the step of selecting comprising: excluding one or more resources to obtain one or more available resources for transmitting the second type of traffic according to the measured RSRP in the first sensing window and ranking the obtained available resources according to the second measured S-RSSI during the second resource selection window.

10. The communication method of claim 7, wherein the first sensing window and the second sensing window are overlapped when both of the first type of traffic and the second type of traffic are triggered simultaneously.

11. The communication method of claim 7, wherein the first resource selection window and the resource second selection window are configured, preconfigured, or specified according to one or more of the following additional schemes when both of the first type of traffic and the second type of traffic are triggered:

a scheme in which the first resource selection window and the second resource selection window are Frequency-Division Multiplexed (FDMed);

a scheme in which the first resource selection window and the second resource selection window are Code-Division Multiplexed (CDMed); and a scheme in which a priority for selecting resources in the first resource selection window and in the second resource selection window is configured, preconfigured, or specified according to priorities of the first type of traffic and the second type of traffic.

12. The communication method of claim 7, wherein the transmission resource pool is configured or preconfigured with one or more of the following configurations:

a configuration in which a first transmission resource pool and a second transmission resource pool respectively for the first type of traffic and the second type of traffic are shared, wherein the first type of traffic and the second type of traffic comprise periodic traffic and aperiodic traffic, respectively;

a configuration in which the first transmission resource pool and the second transmission resource pool respectively for the first type of traffic and the second type of traffic are separated, wherein the first type of traffic and the second type of comprise periodic traffic and aperiodic traffic, respectively;

a configuration in which a first transmission resource pool and a second transmission resource pool respectively for a first transmission mode of traffic and a second transmission mode of traffic respectively are separated, wherein transmission mode comprise one or more of broadcast, unicast, and multicast;

a configuration in which a first transmission resource pool for a first carrier for transmitting one or more traffic and a second transmission resource pool for a second carrier for transmitting one or more traffic are separated; and a configuration in which a first transmission resource pool for a first zone in which a first transmission mode of traffic is transmitted via sidelink and a second transmission resource pool for a second zone in which a second transmission mode of traffic is transmitted via sidelink are separated.

13. A user equipment, comprising:

a receiver, operative to receive traffic; andcircuitry, operative to decode the received traffic, wherein the received traffic is transmitted using one or more resources that are selected from a transmission resource pool during a resource selection according to a sensing result in a sensing window, and wherein the sensing result is generated by sensing a plurality of resources within the transmission resource pool during the sensing window, wherein one or more of the sensing window and the resource selection window is configured, preconfigured, or specified according to a type of the traffic, wherein a first sensing window is configured, preconfigured, or specified for a first type of traffic and a second sensing window is configured, preconfigured, or specified for a second type of traffic, wherein a first resource selection window is configured, preconfigured, or specified for the first type of traffic and a second resource selection window is configured, preconfigured, or specified for the second type of traffic, wherein a time duration of the second sensing window is shorter than that of the first sensing window, and a time duration of the second resource selection window is shorter than that of the first resource selection window, wherein the first type of traffic includes periodic traffic, and the second type of traffic includes aperiodic traffic, and wherein the first resource selection window and the resource second selection window are configured, preconfigured, or specified, when both of the first type of traffic and the second type of traffic are triggered, according to a scheme in which the first resource selection window and the second resource selection window are Time-Division Multiplexed (TDMed), wherein the second resource selection window is earlier than the first resource selection window.

14. A communication method, comprising:

receiving traffic; and decoding the received traffic, wherein the received traffic is transmitted by using one or more resources that are selected from a transmission resource pool during a resource selection according to a sensing result in a sensing window, and wherein the sensing result is generated by sensing a plurality of resources within the transmission resource pool during the sensing window, wherein one or more of the sensing window and the resource selection window is configured, preconfigured, or specified according to a type of the traffic, wherein a first sensing window is configured, preconfigured, or specified for a first type of traffic and a second sensing window is configured, preconfigured, or specified for a second type of traffic, wherein a first resource selection window is configured, preconfigured, or specified for the first type of traffic and a second resource selection window is configured, preconfigured, or specified for the second type of traffic, wherein a time duration of the second sensing window is shorter than that of the first sensing window, and a time duration of the second resource selection window is shorter than that of the first resource selection window, wherein the first type of traffic includes periodic traffic, and the second type of traffic includes aperiodic traffic, and wherein the first resource selection window and the resource second selection window are configured, preconfigured, or specified, when both of the first type of traffic and the second type of traffic are triggered, according to a scheme in which the first resource selection window and the second resource selection window are Time-Division Multiplexed (TDMed), wherein the second resource selection window is earlier than the first resource selection window.

\* \* \* \* \*